(12) United States Patent
Kato et al.

(10) Patent No.: US 6,169,837 B1
(45) Date of Patent: Jan. 2, 2001

(54) DISPERSION-FLATTENED OPTICAL FIBER

(75) Inventors: Takatoshi Kato; Hitoshi Hatayama; Eisuke Sasaoka; Masayuki Nishimura, all of Yokohama (JP)

(73) Assignee: Sumitomo Electric Industries, Ltd., Osaka (JP)

( * ) Notice: Under 35 U.S.C. 154(b), the term of this patent shall be extended for 0 days.

(21) Appl. No.: 09/341,310

(22) PCT Filed: Jul. 29, 1998

(86) PCT No.: PCT/JP98/03383

§ 371 Date: Jul. 8, 1999

§ 102(e) Date: Jul. 8, 1999

(87) PCT Pub. No.: WO99/30193

PCT Pub. Date: Jun. 17, 1999

(30) Foreign Application Priority Data

Dec. 5, 1997 (JP) .................... 9-335646
Dec. 22, 1997 (JP) .................... 9-353153
Feb. 23, 1998 (JP) .................... 10-040276

(51) Int. Cl.$^7$ .................... G02B 6/02
(52) U.S. Cl. .................... 385/127; 385/123; 385/124
(58) Field of Search .................... 385/123, 124, 385/126, 127, 128; 359/161

(56) References Cited

U.S. PATENT DOCUMENTS

| | | | |
|---|---|---|---|
| 5,649,044 | * 7/1997 | Bhagavatula | 385/124 |
| 5,684,909 | 11/1997 | Liu | 385/127 |
| 5,822,488 | * 10/1998 | Terasawa et al. | 385/127 |
| 5,999,679 | * 12/1999 | Antos et al. | 385/127 |
| 6,072,929 | * 6/2000 | Kato et al. | 385/127 |

FOREIGN PATENT DOCUMENTS

| | | |
|---|---|---|
| 724 171 | 7/1996 | (EP) . |
| 8-234036 | 9/1996 | (JP) . |
| 8-248251 | 9/1996 | (JP) . |
| 9-33744 | 2/1997 | (JP) . |
| 9-159856 | 6/1997 | (JP) . |
| 10-246830 | 9/1998 | (JP) . |
| 10-293225 | 11/1998 | (JP) . |

OTHER PUBLICATIONS

Long Distance Soliton WDM Transmission using a dispersion-flattened fiber, N.Edagawa et al, pp. 1–4 No. A3.
Dispersion–Modified Single–Mode fiber by VAD Method with Low dispersion in the 1–5 μm Wavelengthh Region, M. Ohashi et al, No. A4, pp. 445–448.
Dispersion Flattened Single–Mode Fiber for 10,000km Transmission system, Y. Kubo et al, No. A5, 4 pages, 1990.
Design Optimization of Dispersion Shifted Fiber with Enlarged Mode Field Diameter for WDM Transmission, Y. Terasawa et al, No. A6, pp. 12–13.

* cited by examiner

Primary Examiner—Hemang Sanghavi
(74) Attorney, Agent, or Firm—Pillsbury Madison & Sutro LLP

(57) ABSTRACT

The present invention aims at providing a dispersion-flattened optical fiber which is suitable for wavelength-division multiplexing soliton transmission utilizing an optical amplifier and the like and has a structure for effectively restraining nonlinear optical phenomena from occurring. The dispersion-flattened optical fiber according to the present invention has, as characteristics at a wavelength of 1550 nm, a dispersion with an absolute value of 5 ps/nm/km or less, an effective cross-sectional area of 45 $\mu m^2$ or more, a dispersion slope of 0.03 ps/nm$^2$/km or less, and a cutoff wavelength of 1.0 μm or more at a length of 2 m.

20 Claims, 16 Drawing Sheets

Fig.9

| | EMBODIMENT1 | EMBODIMENT 2 | EMBODIMENT3 | EMBODIMENT4 |
|---|---|---|---|---|
| WAVELENGTH DISPERSION(ps/nm/km) | 0.17 | 0.12 | -2.2 | -0.37 |
| EFFECTIVE CROSS-SECTIONAL AREA($\mu m^2$) | 58 | 72 | 50 | 52.8 |
| WAVELENGTH DISPERSION SLOPE(ps/nm$^2$/km) AT 1530nm AT 1550nm AT 1560nm | 0.018 0.007 0.000 | 0.0096 -0.0120 -0.0265 | 0.0129 0.0172 0.0198 | 0.0005 0.0005 0.0010 |
| CUTOFF WAVELENGTH($\mu m$) | 1.153 | 1.187 | 1.920 | 1.713 |
| POLARIZATION DISPERSION(ps/km$^{1/2}$) | 0.11 | 0.10 | 0.06 | 0.08 |
| PROFILE VOLUME(% $\mu m^2$) | — | — | 13.8 | 8.7 |

Fig.10
| SAMPLE | 1 | 2 | 3 | 4 | 5 |
|---|---|---|---|---|---|
| b2/c2 | 0.65 | 0.65 | 0.65 | 0.72 | 0.80 |
| $\Delta n_3$ | 0.30 | 0.25 | 0.20 | 0.30 | 0.30 |
Fig.11A
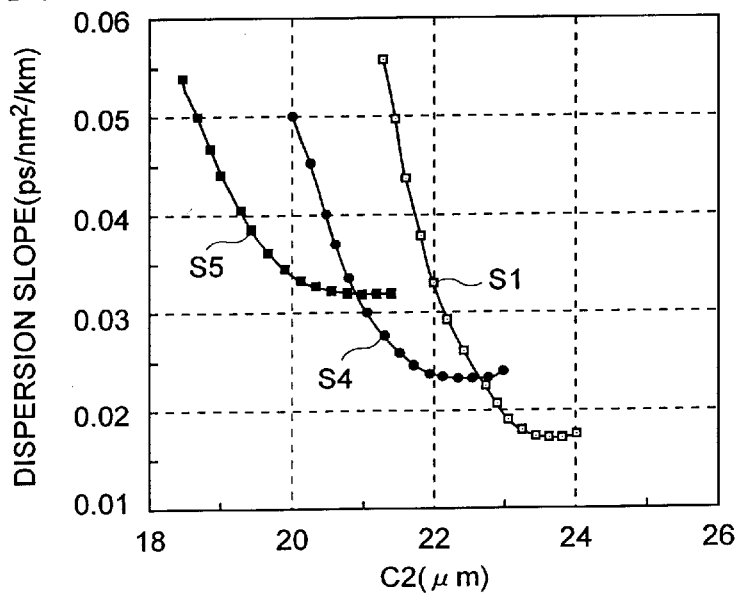
Fig.11B
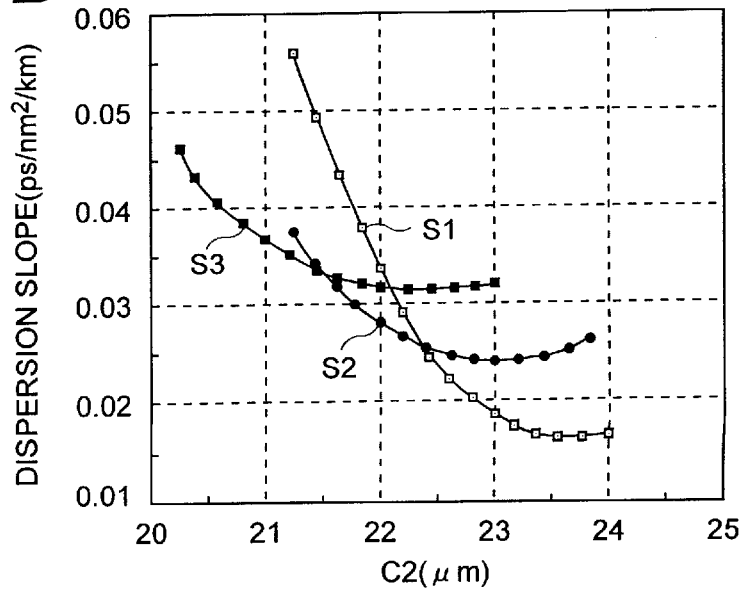

Fig.14

| SAMPLE | 6 | 7 | 8 | 9 |
|---|---|---|---|---|
| WAVELENGTH DISPERSION(ps/nm/km) AT 1550nm | -2.1 | -2.6 | -1.6 | +3.1 |
| WAVELENGTH DISPERSION SLOPE (ps/nm$^2$/km) AT 1550nm | 0.023 | 0.026 | 0.018 | -0.010 |
| EFFECTIVE CROSS-SECTIONAL AREA($\mu$m$^2$) | 50.2 | 50.7 | 50.7 | 53.9 |
| CUTOFF WAVELENGTH($\mu$m) AT 2m | 2.082 | 2.009 | 2.071 | 2.083 |
| BENDING LOSS(dB/m) AT BENDING DIAMETER 32mm(dB/ターン) | 0.03 (0.003) | 0.05 (0.005) | 0.1 (0.01) | 0.1 (0.01) |
| BENDING LOSS(dB/m) AT BENDING DIAMETER 20mm | 0.8 | 1.1 | 7.7 | 9.6 |
| POLARIZATION DISPERSION(ps/km$^{1/2}$) AT 1550nm | 0.07 | 0.05 | 0.03 | 0.07 |
| PROFILE VOLUME(%$\mu$m$^2$) | 11.1 | 9.7 | 11.7 | 15.6 |

DISPERSION-FLATTENED OPTICAL FIBER

TECHNICAL FIELD

The present invention relates to a dispersion-flattened optical fiber suitable for a communication system using an optical fiber network.

BACKGROUND ART

Communication systems constituted by optical fiber networks are capable of long-haul and high-capacity communications, and their capacity has further been increased by time-division multiplexing transmission and wavelength-division multiplexing soliton transmission (see, for example, N. Edagawa, et al., "Long Distance Soliton WDW transmission using a dispersion-flattened fiber," OFC '97, PD19). Such an optical communication system is constituted by a high-performance receiver and transmitter for transmitting and receiving signal light, an optical amplifier for optically amplifying the signal light, an optical fiber for transmitting the signal light, and the like. Among them, the optical amplifier, which is essential for obtaining a high S/N, has an optically amplifiable wavelength band ranging from 1530 nm to 1560 nm, thereby the wavelength of usable signal light is substantially limited within this wavelength bandwidth of 30 nm.

DISCLOSURE OF THE INVENTION

In an optical communication system using an optical amplifier, the strength of signal light in its optical fiber is intensified, thereby nonlinear optical phenomena such as four-wave mixing and self-phase modulation may occur within the optical fiber. Among them, the four-wave mixing can be restrained from occurring when the absolute value of dispersion at the wavelength of signal light is set to about 1 ps/nm/km to 5 ps/nm/km. On the other hand, while the mutual action between self-phase modulation and wavelength dispersion (hereinafter simply referred to as dispersion) is not problematic in the case of soliton transmission of single-wavelength signal light, it may yield the following problems in the case where a plurality of wavelength-multiplexed signal light components are transmitted. Namely, dispersion-shifted optical fibers whose zero-dispersion wavelength has been shifted to a wavelength of about 1550 nm usually have a wavelength dispersion slope (hereinafter simply referred to as dispersion slope) of about 0.07 ps/nm$^2$/km, thereby yielding different dispersion values depending on the wavelength of each signal light component. As a consequence, it may become out of balance with self-phase modulation, thus causing signal light pulses to collapse. Therefore, in such a case, a dispersion-flattened optical fiber having a very small dispersion slope is needed.

When the nonlinear refractive index of an optical fiber is N2, its effective cross-sectional area is $A_{eff}$, the power of signal light is P, and the effective length of the optical fiber is $L_{eff}$, the amount of occurrence of nonlinear phenomena in the optical fiber is given by the following expression (1):

$$N2 \cdot P \cdot L_{eff}/A_{eff} \tag{1}$$

In order to attain a high S/N by enhancing the signal light power P without increasing the amount of occurrence of nonlinear optical phenomena, a large effective cross-sectional area $A_{eff}$ is necessary. In the case of single-wavelength time-division multiplexing transmission, in order to restrain nonlinear optical phenomena from occurring, it is necessary that not only the effective cross-sectional area $A_{eff}$ be enhanced but also the absolute value of dispersion be suppressed to 1 ps/nm/km or less, and the dispersion slope be made very small. Further, in order to keep the loss upon cabling optical fibers from increasing, it is required that bending loss be small. To this end, it is necessary for cutoff wavelength to be set to an appropriate value.

The above-mentioned nonlinear refractive index N2 is defined as follows. Namely, the refractive index N of a medium under strong light differs depending on the power of the light. Consequently, the lowest-order effect with respect to the refractive index N is represented by the following expression (2):

$$N = N0 + N2 \cdot E^2 \tag{2}$$

wherein
N0 is the refractive index with respect to linear polarization;
N2 is the nonlinear refractive index with respect to the third-order nonlinear polarization; and
E is the photoelectric field amplitude.

Under strong light, the refractive index N of the medium is given by the sum of the normal value N0 and the increment proportional to the square of the photoelectric field amplitude E. In particular, the constant of proportionality N2 (unit: m$^2$/V$^2$) in the second term is known as nonlinear refractive index.

As disclosed in Japanese Patent Application Laid-Open No.8-248251, the above-mentioned cross-sectional area $A_{eff}$ is given by the following expression (3):

$$A_{eff} = 2\pi \left( \int_0^\infty E^2 r\, dr \right)^2 \bigg/ \left( \int_0^\infty E^4 r\, dr \right) \tag{3}$$

wherein E is the electric field accompanying the propagated light, and r is the radial distance from a core center.

The dispersion slope is defined by the gradient of a graph showing the dispersion characteristic in a predetermined wavelength band.

As a result of studies concerning conventional dispersion-flattened optical fibers, the inventors have found the following problems. Namely, in the conventional dispersion-flattened optical fibers, though the dispersion slope is small, the effective cross-sectional area is only about 30 $\mu$m$^2$ to 40 $\mu$m$^2$, thereby optical power density is high in their core region, thus making it easy for nonlinear optical phenomena such as four-wave mixing to occur intensively. As a consequence, the conventional dispersion-flattened optical fibers have not been suitable for wavelength-division multiplexing optical communication systems using optical amplifiers.

For example, the dispersion-flattened optical fiber disclosed in M. Ohashi, et al., "Dispersion-modified Single-Mode Fiber by VAD Method with Low Dispersion in the 1.5 $\mu$m Wavelength Region," ECOC '88, pp. 445–448 comprises a core region composed of a center core (first core), a second core surrounding the center core, and a third core surrounding the second core; and a cladding surrounding the core region; while having a triple cladding type refractive index profile in which Ge element is added to the center core (first core) such that the relative refractive index difference of the center core with respect to the cladding is enhanced to 0.87%, F element is added to the second core such that the relative refractive index difference of the second core with respect to the cladding is lowered to −0.41%, and Ge element is added to the third core such that the relative refractive index difference of the third core with respect to the cladding is enhanced to 0.23%.

Though this conventional dispersion-flattened optical fiber attains a dispersion slope of 0.023 ps/nm$^2$/km at a wavelength of 1550 nm, its effective cross-sectional area $A_{eff}$ is only about 37 $\mu$m$^2$.

Also, the dispersion-flattened fiber disclosed in Y. Kubo, et al., "Dispersion Flattened Single-Mode Fiber for 10,000 km Transmission System," ECOC '90, pp. 505–508 comprises a core region composed of a center core and a second core surrounding the center core, and a cladding surrounding the core region; while having a W-shaped refractive index profile in which Ge element is added to the center core such that the relative refractive index difference of the center core with respect to the cladding is enhanced to 0.9%, and F element is added to the second core such that the relative refractive index difference of the second core with respect to the cladding is lowered to −0.4%.

Though this conventional dispersion-flattened optical fiber also attains a dispersion slope of 0.023 ps/nm$^2$/km at a wavelength of 1550 nm, its effective cross-sectional area $A_{eff}$ is 30 $\mu$m$^2$ or less.

On the other hand, though typical dispersion-shifted optical fibers have a relatively large effective cross-sectional area $A_{eff}$ of about 50 $\mu$m$^2$, their dispersion slope is about 0.07 ps/nm$^2$/km, thus being greatly influenced by dispersion. Therefore, they are not suitable for long-distance optical transmission, either (see, for example, Y. Terasawa, et al., "Design Optimization of Dispersion Shifted Fiber with Enlarged Mode Field Diameter for WDM Transmission," IOOC '95, FA2-2).

Hence, the conventional optical fibers may not suitably be applied to the time-division multiplexing transmission or wavelength-division multiplexing soliton transmission utilizing an optical amplifier.

In order to overcome the above-mentioned problems, it is an object of the present invention to provide a dispersion-flattened optical fiber comprising a structure suitable for the time-division multiplexing transmission or wavelength-division multiplexing soliton transmission in an optical communication system including an optical amplifier.

In order to achieve the above-mentioned object, the dispersion-flattened optical fiber according to the present invention has, as characteristics at a center wavelength 1550 nm in a 1.55-$\mu$m band (1500 nm to 1600 nm), a dispersion with an absolute value not greater than 5 ps/nm/km, an effective cross-sectional area not smaller than 50 $\mu$m$^2$, a dispersion slope not greater than 0.02 ps/nm$^2$/km, and a cutoff wavelength not shorter than 1.0 $\mu$m at a length of 2 m.

Since the absolute value of dispersion is not greater than 5 ps/nm/km at a wavelength of 1550 nm with a dispersion slope not greater than 0.02 ps/nm$_2$/km, the dispersion value would vary only a little among individual signal light components in such a dispersion-flattened optical fiber. Also, since the effective cross-sectional area is not smaller than 50 $\mu$m$^2$, the power density of the signal light being propagated can be suppressed to a low level in the dispersion-flattened optical fiber. As a consequence, nonlinear optical phenomena are effectively restrained from occurring, and transmission can be carried out with a high S/N. Further, this dispersion-flattened optical fiber has an excellent bending characteristic.

For effectively restraining nonlinear optical phenomena from occurring, it is necessary that the effective cross-sectional area be 50 $\mu$m$^2$ or more as mentioned above, more preferably 70 $\mu$m$^2$ or more. Such an increase in effective cross-sectional area, however, increases the bending loss.

Such an increase in bending loss is undesirable when cabling the dispersion-flattened optical fiber. Meanwhile, the suppression of nonlinear optical phenomena can also be realized by intentionally generating a dispersion in the dispersion-flattened optical fiber.

Therefore, the dispersion-flattened optical fiber according to the present invention can also attain a preferable relationship between the above-mentioned effective cross-sectional area and dispersion slope by setting the effective cross-sectional area to 45 $\mu$m$^2$ or more, and the dispersion slope to 0.03 or less.

The dispersion-flattened optical fiber having the characteristics mentioned above can be realized when its core region is constituted by a first core having a predetermined refractive index; and a second core, provided on the outer periphery of the first core, having a refractive index higher than that of the first core (ring core structure). Alternatively, the above-mentioned core region can be constituted by a first core having a predetermined refractive index; a second core, provided on the outer periphery of the first core, having a refractive index lower than that of the first core; and a third core, provided on the outer periphery of the second core, having a refractive index higher than that of the second core (three-layer core structure). Its cladding region can have a depressed cladding structure comprising a first cladding (inner cladding) disposed on an outer periphery of the core region; and a second cladding (outer cladding), disposed on an outer periphery of the first cladding, having a refractive index higher than that of the first cladding. The dispersion-flattened optical fiber may also be realized by combining this depressed cladding structure with any of the above-mentioned ring core structure and three-layer core structure.

In view of the case actually employed as a transmission line, it is preferred that the dispersion-flattened optical fiber having the above-mentioned ring core structure or three-layer core structure with the above-mentioned characteristics further have a polarization dispersion of 0.15 ps/km$^{1/2}$ or less as a characteristic at a wavelength of 1550 nm. Also, in view of cabling, the dispersion-flattened optical fiber preferably has a transmission loss of 0.5 dB/turn or less when bent into a diameter of 32 mm and, when it has the above-mentioned three-layer core structure in particular, its cutoff wavelength is preferably 1.4 $\mu$m or longer at a length of 2 m.

Also, the inventors have found that, in the dispersion-flattened optical fiber having the above-mentioned three-layer core structure, the third core greatly contributes to lowering the dispersion slope and increasing the cutoff wavelength, thereby reducing the bending loss. Namely, in the dispersion-flattened optical fiber having the three-layer core structure, when the outside diameter of the second core is b, the outside diameter of the third core is c, and the relative refractive index difference of the third core with respect to a reference area in the cladding region is $\Delta n_3$, the following relationships:

$\Delta n_3 \geq 0.25\%$ $0.40 \leq b/c \leq 0.75$ are preferably satisfied.

In other words, when the relative refractive index difference of the third core with respect to the reference area in the cladding region is $\Delta n(r)$ at a location where the radial distance from a center of the core region is r, the profile volume of the third core preferably satisfies the following condition:

$$\int_{b/2}^{c/2} \Delta n(r) r \, dr \geq 7.0 \, (\% \cdot \mu m^2)$$

Here, the cladding region can have the above-mentioned depressed cladding structure. In this case, the reference area for defining the relative refractive index difference of each glass region is the second cladding.

In the dispersion-flattened optical fiber constituted by the combination of the three-layer core structure and the depressed cladding structure, when the outside diameter of the first core is a, the outside diameter of the second core is b, the outside diameter of the third core is c, the relative refractive index difference of the first core with respect to the second cladding is $\Delta n_1$, and the relative refractive index difference of the first cladding with respect to the second cladding is $\Delta n_4$, the following relationships:

$0.40\% \leq \Delta n_1 \leq 0.90\%$ $\Delta n_4 \leq -0.02\%$ $0.20 \leq a/c \leq 0.35$ $20 \, \mu m \leq c \leq 30 \, \mu m$ are preferably satisfied.

In addition, in view of fluctuations in manufacture, the dispersion-flattened optical fiber according to the present invention must be designed so as to be tolerable to such fluctuations. Specifically, about ±2% of fluctuations in manufacture may occur in the outside diameter of the core region among manufactured lots (i.e., the outside diameter is only controllable within a range not smaller than about ±2%). Hence, it is necessary for the dispersion-flattened optical fiber according to the present invention to suppress, as much as possible, the variations in characteristics caused by fluctuations in the outside diameter of the core region, such as variations in dispersion slope in particular.

Experiments conducted by the inventors have revealed that the dispersion slope value tends to decrease as the outside diameter of the core region increases and then increase as the latter further increases (the dispersion slope acquires its minimum value when the outside diameter of the core region is at a predetermined value). Therefore, in order to restrain characteristics from varying due to fluctuations in manufacture, the outside diameter of the core region in the dispersion-flattened optical fiber according to the present invention is set within a range of ±2% centered at the outside diameter of the core region where the dispersion slope acquires the minimum value. In particular, in the case where the outside diameter of the core region fluctuates within the range of ±2% with respect to its designed value, the amount of variance of dispersion slope is suppressed to 0.003 ps/nm²/km or less.

BRIEF DESCRIPTION OF THE DRAWINGS

FIG. 1A is a view showing a cross-sectional structure of a dispersion-flattened optical fiber having a ring core structure according to the present invention, whereas

FIG. 5A is a view showing a cross-sectional structure of a dispersion-flattened optical fiber having a three-layer core structure according to the present invention, whereas

FIG. 9 is a table listing various characteristics of the individual dispersion-flattened optical fiber according to Embodiments 1 to 4;

FIG. 10 is a table listing the results of measurement in which samples 1 to 5 having the refractive index profile of FIG. 5B are prepared, and the ratio of the outside diameter of the second core to the outside diameter of the third core (b2/c2) and the relative refractive index difference ($\Delta n_3$) of the third core with respect to the second cladding (outer cladding) are measured in each of these samples 1 to 5;

FIGS. 11A and 11B are graphs showing changes in dispersion slope (ps/nm²/km) with respect to the outside diameter of the core region (outside diameter c2 of the third core) concerning the samples 1 to 5 having the refractive index profile of FIG. 5B;

FIG. 14 is a table listing various characteristics of samples 6 to 8 having their respective refractive index profiles shown in FIGS. 13A to 13C;

FIGS. 15A to 15D are graphs showing changes in various characteristics with respect to changes in the outside diameter of the core region (outside diameter c2 of the third core) in sample 7 which is prepared such as to yield the refractive index profile shown in FIG. 13B, wherein FIG. 15A shows a relationship between the outside diameter ($\mu$m) of the core region and the effective cross-sectional area ($\mu$m²), FIG. 15B shows a relationship between the outside diameter ($\mu$m) of the core region and the bending loss (dB/m) when bent at a diameter of 20 mm, FIG. 15C is a relationship between the outside diameter ($\mu$m) of the core region and the dispersion slope (ps/nm²/km), and FIG. 15D shows a relationship between the outside diameter ($\mu$m) of the core region and the dispersion (ps/nm/km);

FIGS. 16A and 16B are graphs showing relationship between changes in outside diameter of the core region and various characteristics concerning sample 8, wherein FIG. 16A shows relationships between the outside diameter of the core region and the dispersion (ps/nm/km) and dispersion slope (ps/nm²/km), whereas FIG. 16B shows a relationship of the amount of change in dispersion slope (ps/nm²/km/%) to the ratio of change in outside diameter of the core region (%);

FIG. 17A is a graph showing a relationship between the bending diameter (mm) and the bending loss (dB/m), whereas FIG. 18A is a graph showing a relationship between the profile volume (%·μm²) of the third core and the dispersion slope (ps/nm²/km) concerning the samples 1 to 5, whereas

BEST MODES FOR CARRYING OUT THE INVENTION

Figure 1A:
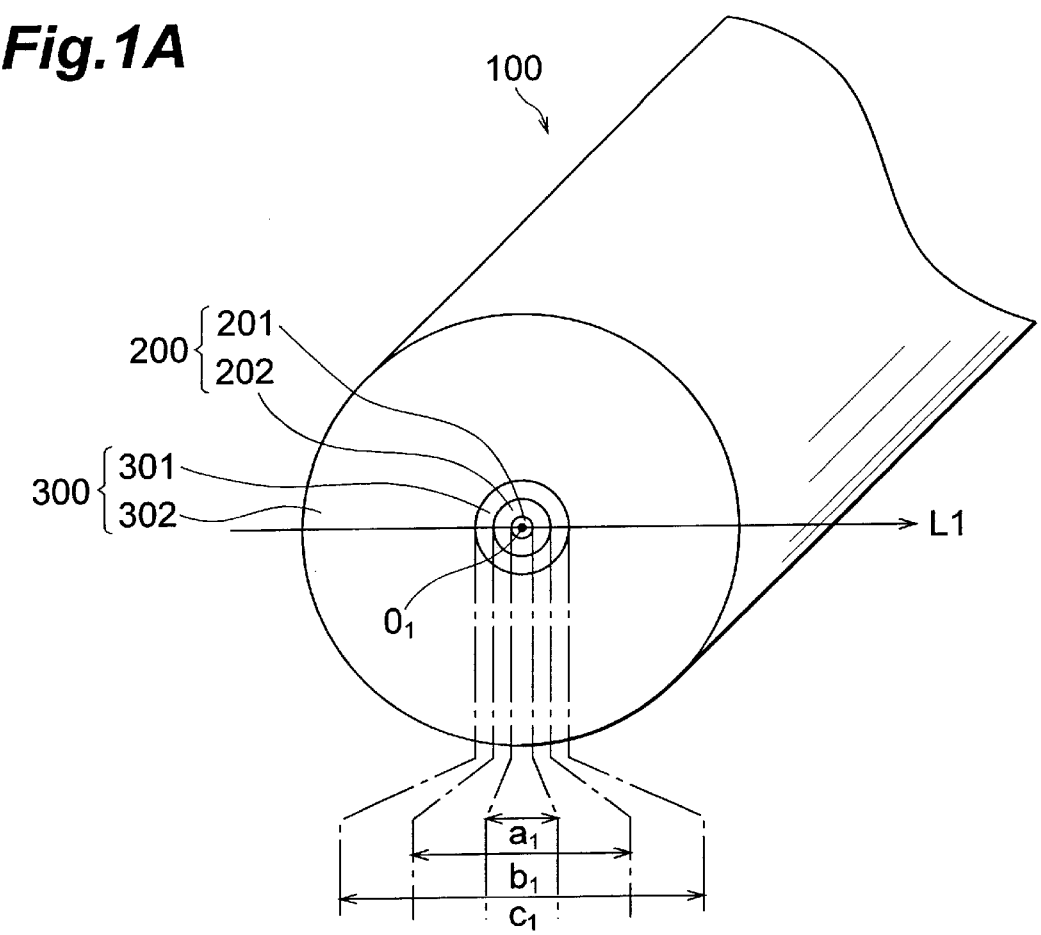

In the following, embodiments of the present invention will be explained with reference to FIGS. 1A, 1B, 2 to 4, 5A, 5B, 6 to 10, 11A to 13C, 14, and 15A to 18B. In the explanation of the drawings, constituents identical to each other will be referred to with numerals or letters identical to each other, without repeating their overlapping descriptions.

The dispersion-flattened optical fiber according to the present invention is applicable to long-distance submarine cables or the like and is a silica-based single mode optical fiber for propagating at least one signal light component in the 1.55-μm wavelength band (at least one signal light components having its center wavelength within the range of 1500 nm to 1600 nm). Also, this dispersion-flattened optical fiber comprises a core region extending along a predetermined axis and a cladding region provided on the outer periphery of the core region, and is designed such that its dispersion slope becomes small in the 1.55-μm wavelength band, which is the signal wavelength band thereof, in order to reduce fluctuations in dispersion among the signal light components propagated thereby.

Specifically, the dispersion-flattened optical fiber according to the present invention has, as characteristics at a wavelength of 1550 nm, a dispersion with an absolute value of 5 ps/nm/km or less, an effective cross-sectional area $A_{eff}$ of 45μm² or more, preferably 50 μm² or more, more preferably 70 μm² or more, a dispersion slope of 0.03 ps/nm²/km or less, preferably 0.02 ps/nm²/km or less, and a cutoff wavelength of 1.0 μm or longer at a length of 2 m.

Further, it is preferred that the dispersion-flattened optical fiber according to the present invention have, as characteristics at a wavelength of 1550 nm, a polarization dispersion of 0.15 ps/km$^{1/2}$ or less, and a transmission loss of 0.5 dB/turn or less when bent into a diameter of 32 mm. The above-mentioned transmission loss is obtained when a transmission loss measured in the state where a plurality of turns of optical fiber to be measured are wound around a mandrel having a diameter of 32 mm is converted into a per-turn value, and will hereinafter be referred to as bending loss.

As the structure realizing the above-mentioned various characteristics, the core region extending along the predetermined axis can have either a ring core structure comprising a first core having a predetermined refractive index, and a second core, provided on the outer periphery of the first core, having a refractive index higher than that of the first core; or a three-layer core structure comprising a first core having a predetermined refractive index, a second core, provided on the outer periphery of the first core, having a refractive index lower than that of the first core, and a third core, provided on the outer periphery of the second core, having a refractive index higher than that of the second core. In the case of the three-layer core structure, it is necessary for the cutoff wavelength at a length of 2 m to be 1.4 μm or longer. Also, the cladding region provided on the outer periphery of the core region can have a depressed cladding structure comprising a first cladding (inner cladding) provided on the outer periphery of the core region; and a second cladding (outer cladding), provided on the outer periphery of the first cladding, having a refractive index higher than that of the first cladding.

In particular, in the dispersion-flattened optical afiber having a three-layer core structure, when the outside diameter of the second core is b, the outside diameter of the third core is c, and the relative refractive index difference of the third core with respect to a reference area (the second cladding in the case of the depressed cladding structure) in the cladding region is $\Delta n_3$, the following relationships:

$\Delta n_3 \geq 0.25\%$ $0.40 \leq b/c \leq 0.75$ are preferably satisfied.

Also, when the relative refractive index difference of the third core with respect to the reference area in the cladding region is $\Delta n(r)$ at a location where the radial distance from a center of the core region is r, the profile volume of the third core preferably satisfies the following condition:

$$\int_{b/2}^{c/2} \Delta n(r) r \, dr \geq 7.0 \ (\% \cdot \mu m^2)$$

Further, in the dispersion-flattened optical fiber constituted by the combination of the three-layer core structure and the depressed cladding structure, when the outside diameter of the first core is a, the outside diameter of the second core is b, the outside diameter of the third core is c, the relative refractive index difference of the first core with respect to the second cladding is $\Delta n_1$, and the relative refractive index difference of the first cladding with respect to the second cladding is $\Delta n_4$, the following relationships:

$0.40\% \leq \Delta n_1 \leq 0.90\%$ $\Delta n_4 \leq -0.02\%$ $0.20 \leq a/c \leq 0.35$ $20 \ \mu m \leq c \leq 30 \ \mu m$ are preferably satisfied.

Here, the relative refractive index difference of each region with respect to the reference area of the cladding region is given by the following expression (4):

$(n_T - n_R)/n_R$ \hfill (4)

wherein $n_T$ is the refractive index of the target glass region, and $n_R$ is the refractive index of the reference cladding area (the refractive index of the second cladding in the case where the cladding region has the depressed cladding structure). In this specification, the relative refractive index difference of each glass region is expressed in terms of percentage, and the individual parameters in the expression (4) may be arranged in any order. Consequently, the relative refractive index difference indicated as a negative value means a region having a refractive index lower than that of the reference area.

Also, it is preferred that the outside diameter of the core region be set within a variable range of ±2% centered at the value where the dispersion slope acquires its minimum value. Specifically, the inventors have found it preferable to design such that, for tolerating fluctuations in manufacture, the amount of fluctuation in dispersion slope be 0.03 ps/nm²/km or less with respect to the fluctuation of the outside diameter of the core region ranging ±2%.

In the following, Embodiments of the dispersion-flattened optical fiber according to the present invention will be explained successively. Each of the dispersion-flattened optical fibers according to Embodiments 1 and 2 explained in the following has a core region of a ring core structure and a cladding region of a depressed cladding structure. The dispersion-flattened optical fiber according to Embodiment 3 has a core region of a three-layer core structure and a cladding region of a depressed cladding structure. The dispersion-flattened optical fiber according to Embodiment 4 has a core region of a three-layer core structure and a cladding region of a single layer.

EMBODIMENT 1

Figure 1B:
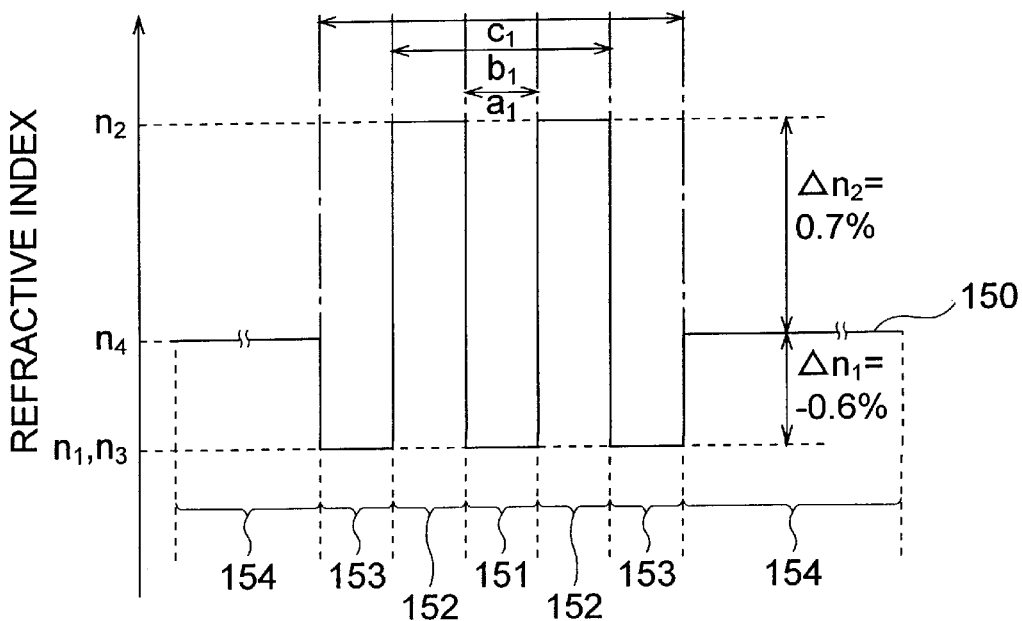
FIG. 1B is a refractive index profile indicated along the line L1 in FIG. 1A.

FIG. 1A is a view showing a cross-sectional structure of the dispersion-flattened optical fiber according to Embodiment 1, whereas FIG. 1B is a refractive index profile indicated along the line L1 in FIG. 1A. Here, the line L1 is a line intersecting with a point $O_1$ which indicates the center axis of the dispersion-flattened optical fiber 100. The dispersion-flattened optical fiber 100 according to Embodiment 1 comprises a core region 200 of a ring core structure and a cladding region 300 of a depressed cladding structure. The core region 200 comprises a first core 201 having an outside diameter al and a refractive index $n_1$; and a second core 202, provided on the outer periphery of the first core 201, having an outside diameter b1 and a refractive index $n_2$ ($>n_1$). The cladding region 300 comprises a first cladding 301, provided on the outer periphery of the second core 202, having an outside diameter c1 and a refractive index $n_3$ ($=n_1$); and a second cladding 302, provided on the outer periphery of the first cladding 301, having a refractive index $n_4$ ($>n_3$).

Here, the refractive index profile 150 in FIG. 1B indicates the refractive index of each area along the line L1 in FIG. 1A, in which areas 151, 152, 153, and 154 correspond to the locations, on the line L1, of the first core 201, second core 202, first cladding 301, and second cladding 302, respectively.

Figure 2:
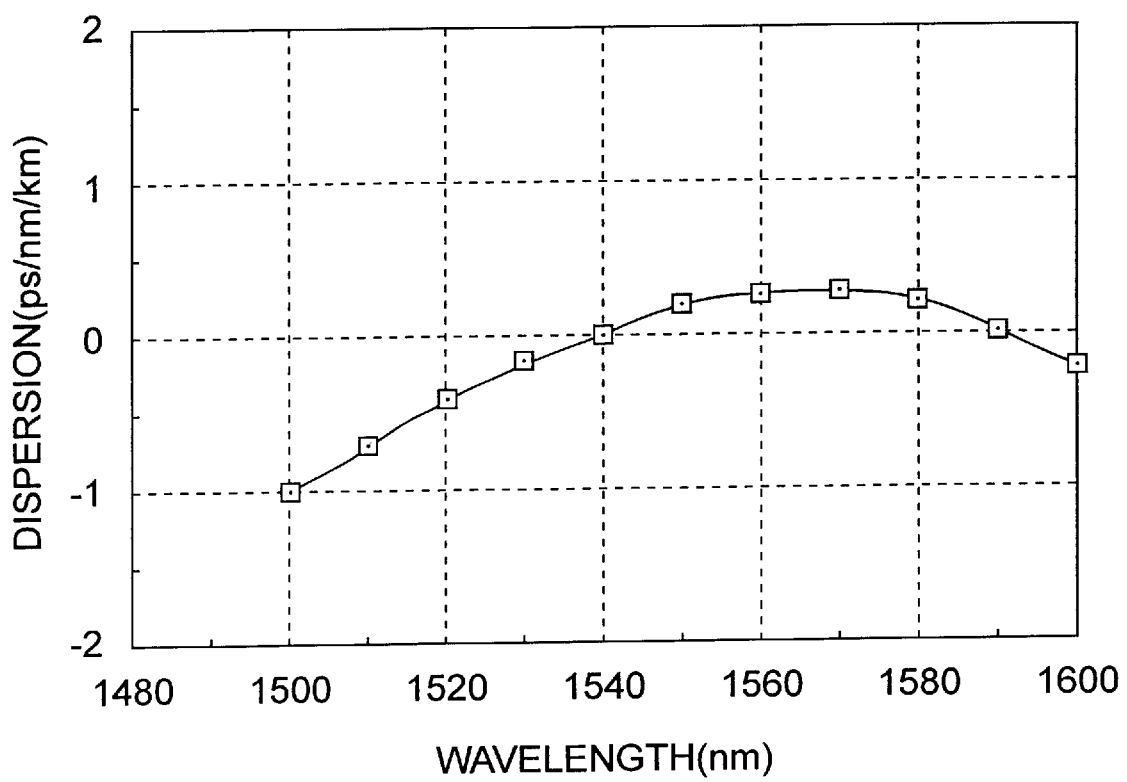
FIG. 2 is a graph showing a dispersion characteristic of the dispersion-flattened optical fiber according to Embodiment 1 (ring core structure) having the refractive aindex profile shown in FIG. 1B.

In Embodiment 1, with respect to the second cladding 302 (reference area of the cladding region 300), the relative refractive index difference $\Delta n_1$ of the first core 201 and the relative refractive index difference $\Delta n_3$ of the first cladding 301 are −0.6% each, whereas the relative refractive index difference $\Delta n_2$ of the second core 202 is 0.7%. The outside diameter a1 of the first core 201 is 3.04 μm, the outside diameter b1 of the second core 202 is 7.26 μm, the outside diameter c1 of the first cladding 301 is 13.2 μm, and the outside diameter of the dispersion-flattened optical fiber 100 (outside diameter of the second cladding 302) is 125 μm. The relative refractive index difference of each region is given as follows:

$\Delta n_1 = (n_1 - n_4)/n_4$ $\Delta n_2 = (n_2 - n_4)/n_4$ $\Delta n_3 = (n_3 - n_4)/n_4$ The inventors measured various characteristics of thus designed dispersion-flattened optical fiber 100 according to Embodiment 1 at a wavelength of 1550 nm. As a result, the dispersion value at a wavelength of 1550 nm was 0.17 ps/nm/km (<|5| ps/nm/km), the effective cross-sectional area $A_{eff}$ at a wavelength of 1550 nm was 58 μm² (>45 μm²) and the cutoff wavelength at a length of 2 m was 1.153 μm (>1.0 μm). Also, the dispersion slope was 0.018 ps/nm²/km at a wavelength of 1530 nm, 0.007 ps/nm²/km at a wavelength of 1550 nm (<0.03 ps/nm²/km), and 0.000 ps/nm²/km at a wavelength of 1560 nm. Further, the polarization dispersion value at a wavelength of 1550 nm was 0.11 ps/km$^{1/2}$ (<0.15 ps/km$^{1/2}$). FIG. 2 is a graph showing a dispersion characteristic of the dispersion-flattened optical fiber 100 according to Embodiment 1.

EMBODIMENT 2

Figure 3:
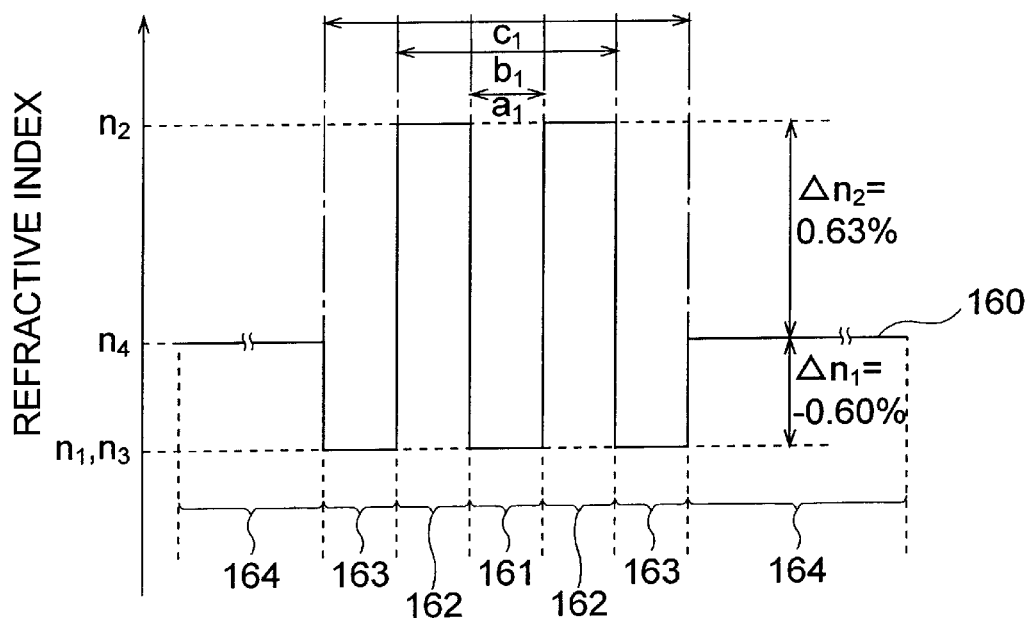
FIG. 3 is a refractive index profile of the dispersion-flattened optical fiber according to Embodiment 2 (ring core structure+depressed cladding structure) of the present invention.

FIG. 3 is a refractive index profile of the dispersion-flattened optical fiber according to Embodiment 2 of the present invention. The cross-sectional structure of the dispersion-flattened optical fiber according to Embodiment 2 is the same as that shown in FIG. 1A. Consequently, its refractive index profile 160 is equivalent to the refractive index of each area along the line L1 in FIG. 1A, in which areas 161, 162, 163, and 164 correspond to the locations, on the line L1, of the first core 201, second core 202, first cladding 301, and second cladding 302, respectively.

In Embodiment 2, the outside diameter a1 of the first core (refractive index $n_1$) corresponding to the area 161 is 3.75 μm, the outside diameter b1 of the second core (refractive index $n_2 > n_1$) corresponding to the area 162 is 8.25 μm, the outside diameter c1 of the first cladding (refractive index $n_3 = n_1$) corresponding to the area 163 is 15.0 μm, and the outside diameter of the second cladding (refractive index $n_4 > n_3$) corresponding to the area 164 is 125 μm. Also, with respect to the second cladding, the relative refractive index difference of the first core $\Delta n_1$ ($=(n_1-n_4)/n_4$) and the relative refractive index difference of the first cladding $\Delta n_3$ ($=(n_3-n_4)/n_4$) are −0.60% each, whereas the relative refractive index difference of the second core $\Delta n_2$ ($=(n_2-n_4)/n_4$) is 6.3%.

Figure 4:
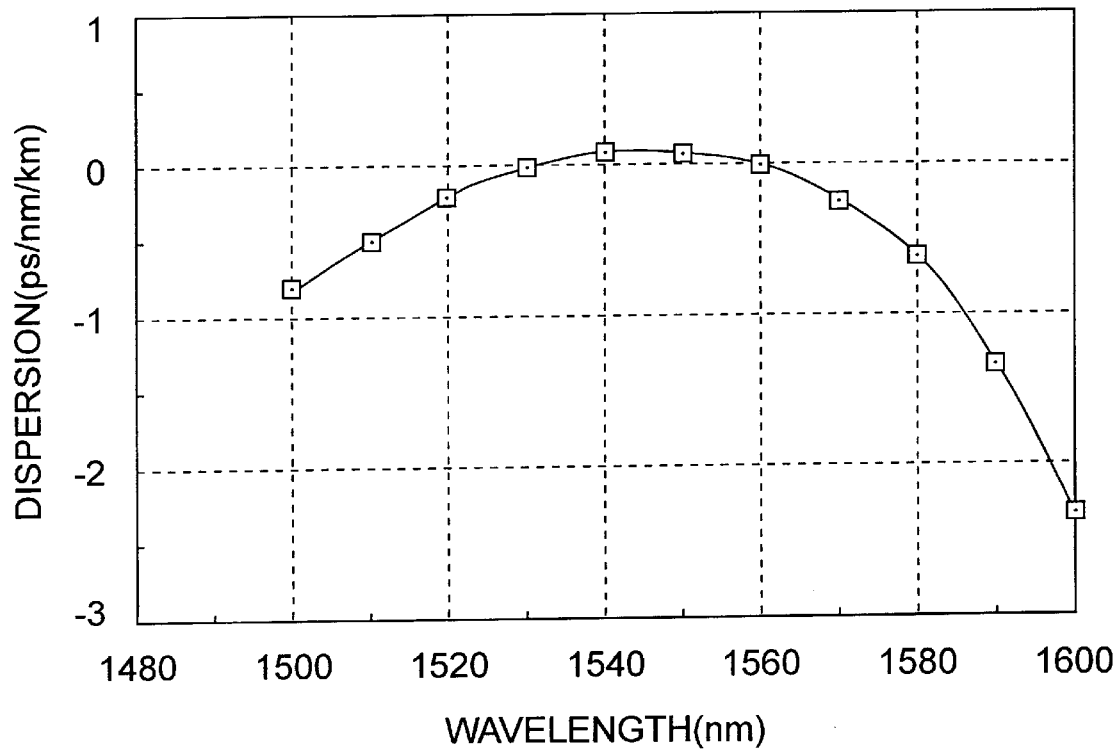
FIG. 4 is a graph showing a dispersion characteristic of the dispersion-flattened optical fiber according to Embodiment 2 having the refractive index profile shown in FIG. 3.

The inventors measured various characteristics of thus designed dispersion-flattened optical fiber according to Embodiment 2 at a wavelength of 1550 nm. As a result, the dispersion value at a wavelength of 1550 nm was 0.12 ps/nm/km (<|5| ps/nm/km), the effective cross-sectional area $A_{eff}$ at a wavelength of 1550 nm was 72 μm² (>45 m²), and the cutoff wavelength at a length of 2 m was 1.187 μm (>1.0 μm). Also, the dispersion slope was 0.0096 ps/nm²/km at a wavelength of 1530 nm, −0.0120 ps/nm²/km at a wavelength of 1550 nm (<0.003 ps/nm²/km), and −0.0265 ps/nm²/km at a wavelength of 1560 nm. Further, the polarization dispersion value at a wavelength of 1550 nm was 0.10ps/km$^{1/2}$ (<0.15 ps/km$^{1/2}$). FIG. 4 is a graph showing a dispersion characteristic of the dispersion-flattened optical fiber according to Embodiment 2.

EMBODIMENT 3

Figure 5A:
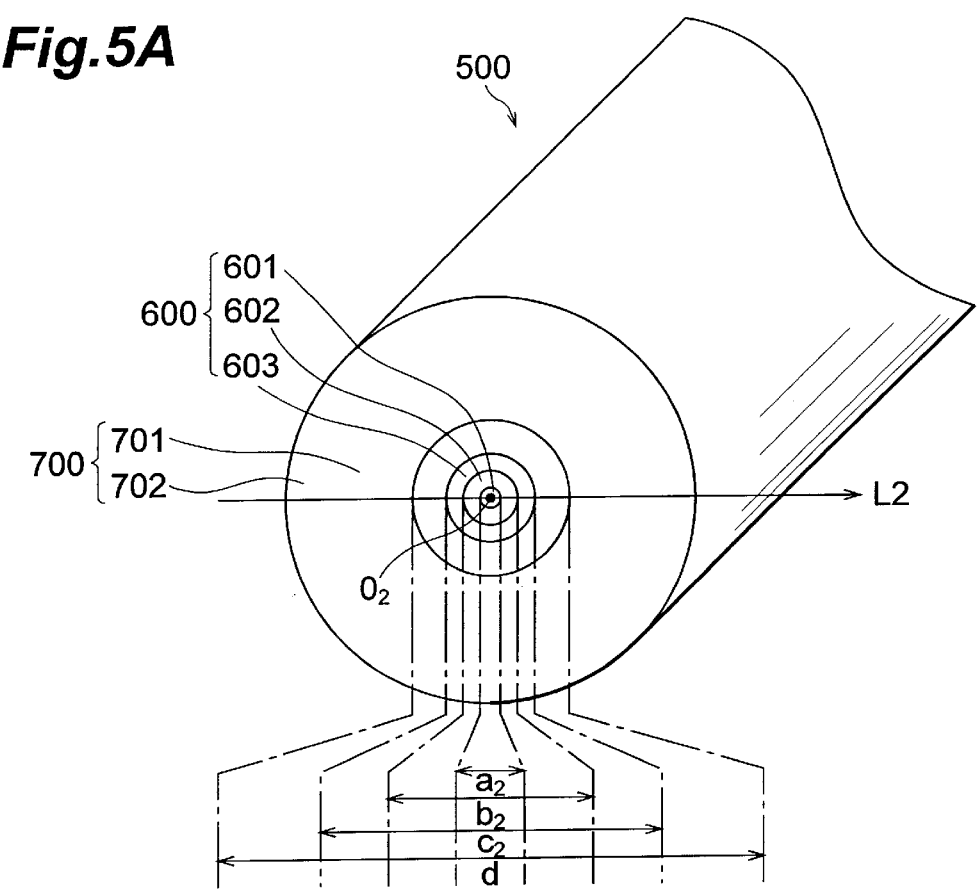
Figure 5B:
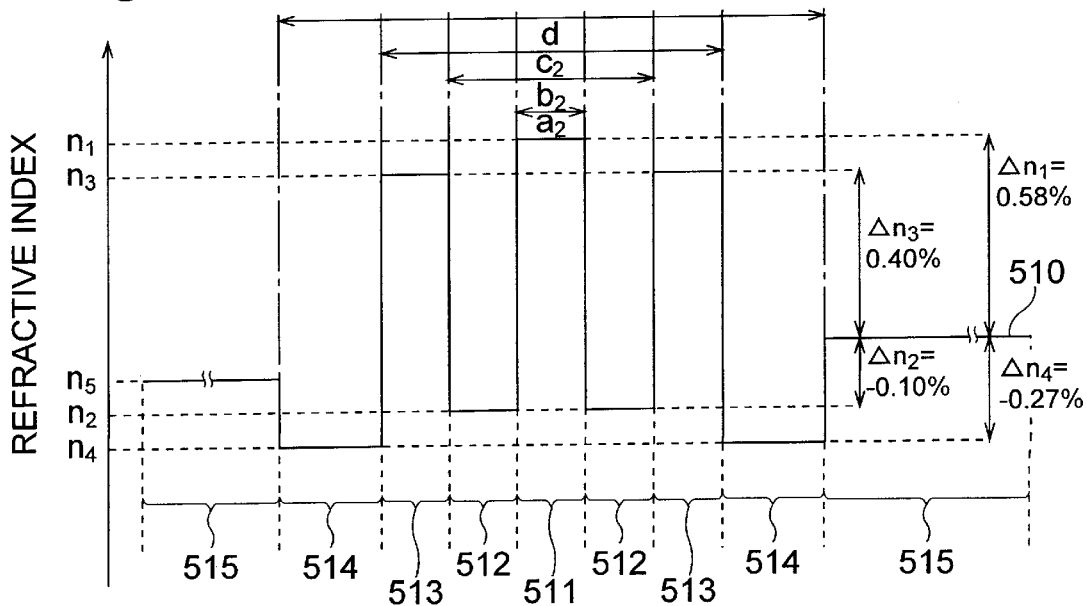
FIG. 5B is a refractive index profile indicated along the line L2 in FIG. 5A.

FIG. 5A is a view showing a cross-sectional structure of the dispersion-flattened optical fiber according to Embodiment 3, whereas FIG. 5B is a refractive index profile indicated along the line L2 in FIG. 5A. Here, the line L2 is a line intersecting with a point $O_2$ which indicates the center axis of the dispersion-flattened optical fiber 500. The dispersion-flattened optical fiber 500 according to Embodiment 3 comprises a core region 600 of a three-layer core structure and a cladding region 700 of a depressed cladding structure. The core region 600 comprises a first core 601 having an outside diameter a2 and a refractive index $n_1$; a second core 602, provided on the outer periphery of the first core 601, having an outside diameter b2 and a refractive index $n_2$ ($<n_1$); and a third core 603, provided on the outer periphery of the second core 602, having an outside diameter c2 and a refractive index $n_3$ ($>n_2$). The cladding region 700 comprises a first cladding 701, provided on the outer periphery of the third core 603, having an outside diameter d and a refractive index $n_4$ ($<n_3$); and a second cladding 702, provided on the outer periphery of the first cladding 701, having a refractive index $n_5$ ($>n_4$).

Here, the refractive index profile 515 in FIG. 5B indicates the refractive index of each area along the line L2 in FIG. 5A, in which areas 511, 512, 513, 514, and 515 correspond to the locations, on the line L2, of the first core 601, second core 602, third core 603, first cladding 701, and second cladding 702, respectively.

Figure 6:
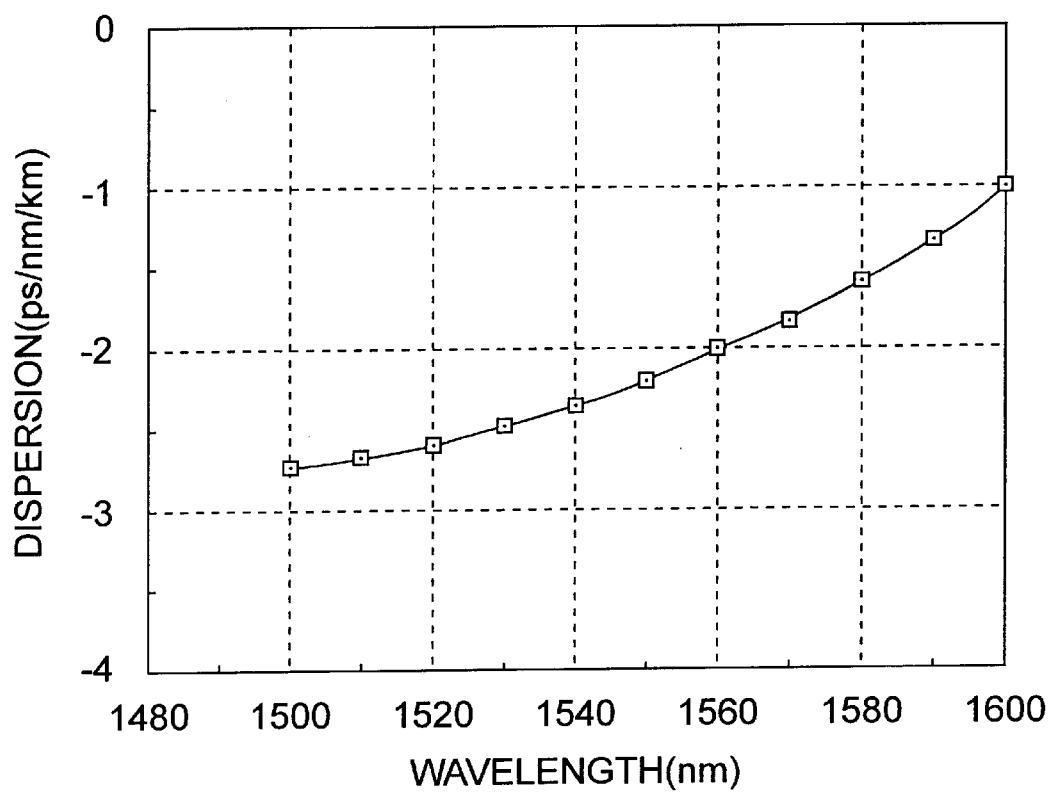
FIG. 6 is a graph showing a dispersion characteristic of the dispersion-flattened optical fiber according to Embodiment 3 having the refractive index profile (three-layer core structure+depressed cladding structure) shown in FIG. 5B.

In Embodiment 3, with respect to the second cladding 702 (reference area of the cladding region 700), the relative refractive index difference $\Delta n_1$ of the first core 601 is 0.58%, the relative refractive index difference $\Delta n_2$ of the second core 602 is $-0.10\%$, the relative refractive index difference $\Delta n_3$ of the third core 603 is 0.40%, and the relative refractive index difference $\Delta n_4$ of the first cladding 701 is $-0.27\%$. The outside diameter a2 of the first core 601 is 5.8 $\mu$m, the outside diameter b2 of the second core 602 is 16.2 $\mu$m, the outside diameter c2 of the third core 603 is 23.2 $\mu$m, the outside diameter d of the first cladding 701 is 46.4 $\mu$m, and the outside diameter of the dispersion-flattened optical fiber 500 (outside diameter of the second cladding 702) is 125 $\mu$m. The relative refractive index difference of each area is given as follows:

$\Delta n_1 = (n_1 - n_5)/n_5$ $\Delta n_2 = (n_2 - n_5)/n_5$ $\Delta n_3 = (n_3 - n_5)/n_5$ $\Delta n_4 = (n_4 - n_5)/n_5$ The inventors measured various characteristics of thus designed dispersion-flattened optical fiber 500 according to Embodiment 3 at a wavelength of 1550 nm. As a result, the dispersion value at a wavelength of 1550 nm was $-2.2$ ps/nm/km ($<|5|$ ps/nm/km), the effective cross-sectional area $A_{eff}$ at a wavelength of 1550 nm was 50 $\mu$m$^2$ ($>45$ $\mu$m$^2$), and the cutoff wavelength at a length of 2 m was 1.920 $\mu$m ($>1.0$ $\mu$m). Also, the dispersion slope was 0.0129 ps/nm$^2$/km at a wavelength of 1530 nm, 0.0172 ps/nm$^2$/km at a wavelength of 1550 nm ($<0.03$ ps/nm$^2$/km), and 0.0198 ps/nm$^2$/km at a wavelength of 1560 nm. Further, the polarization dispersion value at a wavelength of 1560 nm was 0.06 ps/km$^{1/2}$ ($<0.15$ ps/km$^{1/2}$). FIG. 6 is a graph showing a dispersion characteristic of the dispersion-flattened optical fiber according to Embodiment 3.

EMBODIMENT 4

Figure 7:
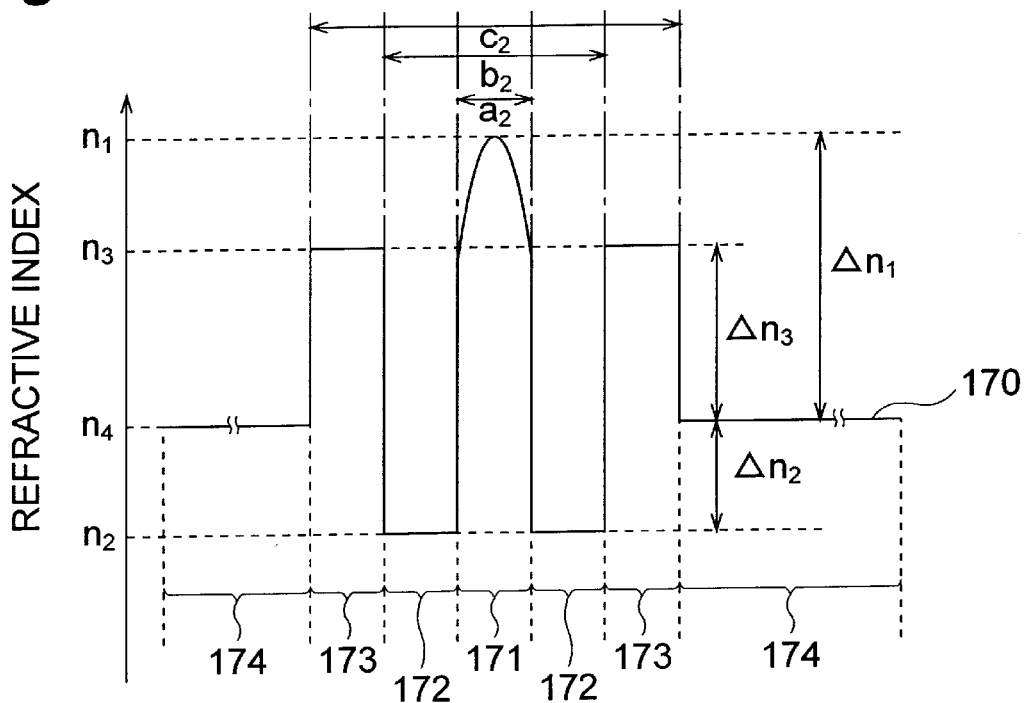
FIG. 7 is a refractive index profile of the dispersion-flattened optical fiber according to Embodiment 4 (three-layer core structure) of the present invention.

FIG. 7 is a refractive index profile of the dispersion-flattened optical fiber according to Embodiment 4 of the present invention. The dispersion-flattened optical fiber according to Embodiment 4 has a core region of a three-layer core structure and a cladding region of a single layer. Its refractive index profile 170 is also known as a triple cladding type refractive index profile.

The refractive index profile 170 is basically equivalent to the refractive index of each area along the line L2 in FIG. 5A, in which areas 171, 172, 173, and 174 correspond to the locations, on the line L2, of the first core 601, second core 602, third core 603, and second cladding 702, respectively. In the dispersion-flattened optical fiber according to Embodiment 4, however, there is no region corresponding the first cladding in FIG. 5A.

In Embodiment 4, the outside diameter a2 of the first core (refractive index $n_1$) corresponding to the area 171 is 7.3 $\mu$m, the outside diameter b2 of the second core (refractive index $n_2 < n_1$) corresponding to the area 172 is 15.0 $\mu$m, the outside diameter c2 of the third cladding (refractive index $n_3 > n_2$) corresponding to the area 173 is 22.0 $\mu$m, and the outside diameter of the cladding (refractive index $n_4 < n_3$) corresponding to the area 174 is 125 $\mu$m. Also, with respect to the cladding, the relative refractive index difference of the first core $\Delta n_1 (=(n_1 - n_4)/n_4)$ is 0.58%, the relative refractive index difference of the second core $\Delta n_2 (=(n_2 - n_4)/n_4)$ is $-0.18\%$, and the relative refractive index difference of the third core $\Delta n_3 (=(n_3 - n_4)/n_4)$ is 0.27%.

Figure 8:
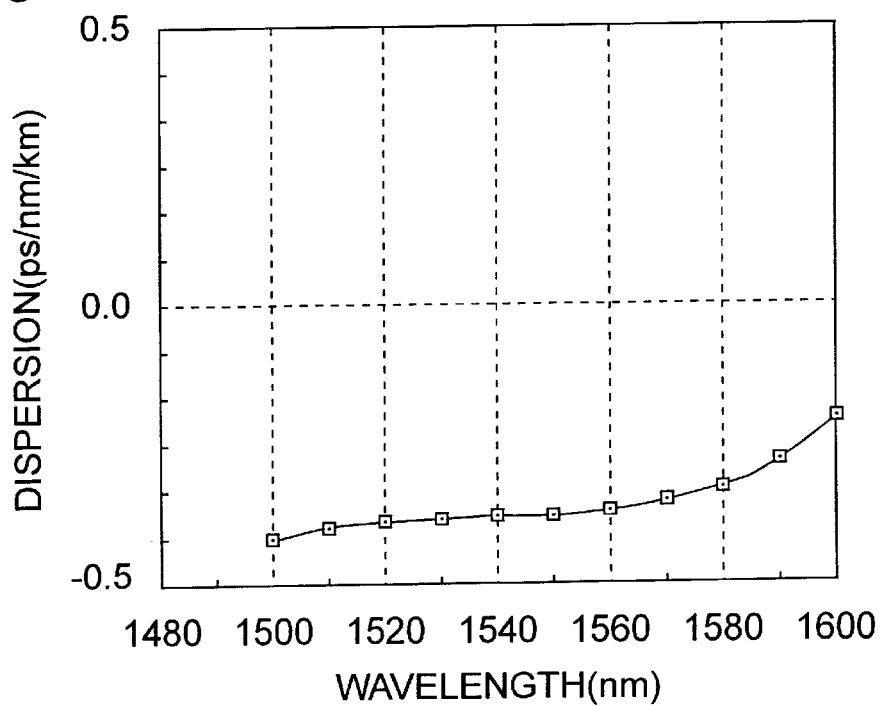
FIG. 8 is a graph showing a dispersion characteristic of the dispersion-flattened optical fiber according to Embodiment 4 having the refractive index profile shown in FIG. 7.

The inventors measured various characteristics of thus designed dispersion-flattened optical fiber according to Embodiment 4 at a wavelength of 1550 nm. As a result, the dispersion value at a wavelength of 1550 nm was $-0.37$ ps/nm/km ($<|5|$ ps/nm/km), the effective cross-sectional area $A_{eff}$ at a wavelength of 1550 nm was 52.8 $\mu$m$^2$ ($>45$ $\mu$m$^2$), and the cutoff wavelength at a length of 2 mwas 1.713 $\mu$m ($>1.0$ $\mu$m). Also, the dispersion slope was 0.0005 ps/nm$^2$/km at a wavelength of 1530 nm, 0.0005 ps/nm$^2$/km at a wavelength of 1550 nm ($<0.003$ ps/nm$^2$/km), and 0.0010 ps/nm$^2$/km at a wavelength of 1560 nm. The transmission loss (bending loss) when bent at a diameter of 20 mmwas 3.2 dB/m. Further, the polarization dispersion value at a wavelength of 1550 nm was 0.08 ps/km$^{1/2}$ ($<0.15$ ps/km$^{1/2}$). FIG. 8 is a graph showing a dispersion characteristic of the dispersion-flattened optical fiber according to Embodiment 4.

FIG. 9 is a table listing various characteristics of each of the dispersion-flattened optical fibers according to Embodiments 1 to 4 explained above at a wavelength of 1550 nm. Each of the dispersion-flattened optical fibers according to these embodiments has a dispersion with an absolute value of 5 ps/nm/km or less, an effective cross-sectional area $A_{eff}$ of 45 $\mu$m$^2$ or more, a dispersion slope of 0.03 ps/nm$^2$/km or less, a cutoff wavelength of 1.0 $\mu$m or longer at length of 2 m, and a polarization dispersion of 0.15 ps/km$^{1/2}$ or less.

Each of the dispersion-flattened optical fibers has a very small dispersion slope, so that the dispersion characteristic is flat, and a large effective cross-sectional area $A_{eff}$ of 45 $\mu$m$^2$ or more, so that the power density of signal light in the dispersion-flattened optical fiber is suppressed to a low level, thus effectively restraining nonlinear optical phenomena from occurring, and enabling transmission with a high S/N. Further, since the cutoff wavelength at a length of 2 m is 1.0 $\mu$m or longer, these dispersion-flattened optical fibers have an excellent bending characteristic (low bending loss). As a consequence, these dispersion-flattened optical fibers are suitable for the time-division multiplexing transmission or wavelength-division multiplexing soliton transmission using an optical amplifier. In particular, the dispersion-flattened optical fiber according to Embodiment 2 (FIG. 3) can suppress the power density of the signal light in the dispersion-flattened optical fiber to a lower level (can more effectively restrain nonlinear optical phenomena from occurring), since the effective cross-sectional area $A_{eff}$ is 70 $\mu$m$^2$ or more. In the dispersion-flattened optical fiber according to Embodiment 3 (FIGS. 5A and 5B), the cutoff wavelength at a length of 2 m is longer than the signal light wavelength. Nevertheless, in view of the fact that the actual transmission distance for signal light ranges from several hundreds of km to several thousands of km as will be explained later, its high-order modes would attenuate, leaving no problems.

Without being restricted to the above-mentioned embodiments, the present invention can be modified in various manners. For instance, the refractive index profiles shown in Embodiments 1 to 4 are merely examples, and there can be various kinds of modes of refractive index profiles for realizing the dispersion-flattened optical fiber according to the present invention.

As applied examples of the dispersion-flattened optical fiber having the refractive index profile shown in FIG. 5B, the inventors prepared samples 1 to 5 in which the profile volume in the third core was changed as shown in FIG. 10, and studied the relationship between the outside diameter of the core region (outside diameter of the third core) c2 and the dispersion slope (ps/nm$^2$/km) and the relationship between the outside diameter of the third core c2 and the cutoff wavelength ($\mu$m) at a length of 2 m in each of the samples 1 to 5. Specifically, varied among the prepared samples 1 to 5 are the ratio of the outside diameter of the second core to the outside diameter of the third core (b2/c2) and the relative refractive index difference of the third core $\Delta n_3$ with respect to the second cladding. On the other hand, the other parameters are common in the prepared samples 1 to 5, i.e., the ratio of the outside diameter of the first core to the outside diameter of the third core (a2/c2) is 0.25, the ratio of the outside diameter of the first cladding to the outside diameter of the third core (d/c2) is 2.0, the relative refractive index difference of the first core $\Delta n_1$ with respect to the second cladding is 0.6%, and the relative refractive index difference of the second core $\Delta n_2$ and relative refractive index difference of the first core $\Delta n_1$ with respect to the second cladding are $-0.05\%$ each.

Figure 12A:
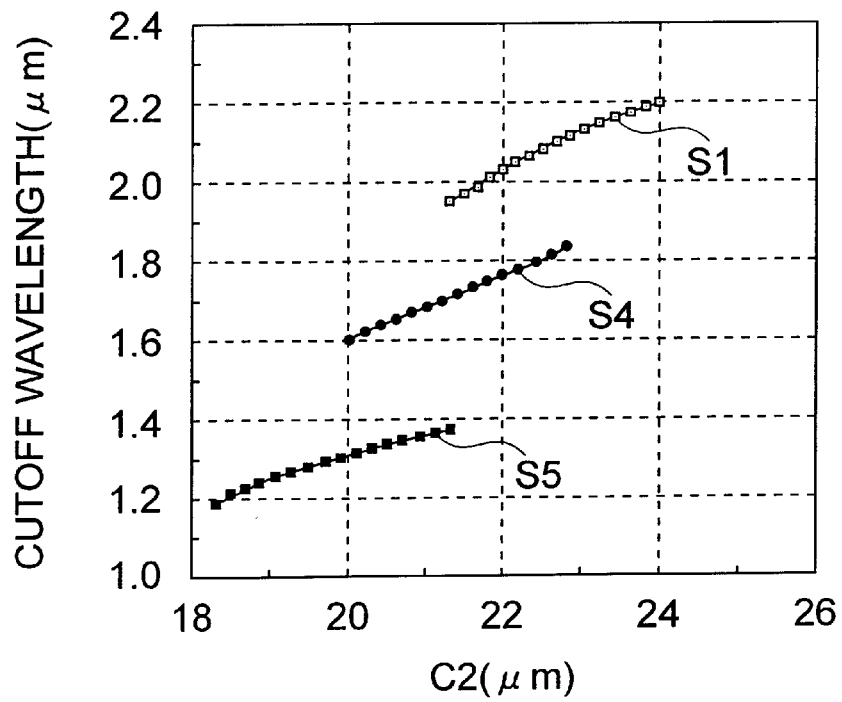
FIGS. 12A and 12B are graphs showing changes in cutoff wavelength ($\mu$m) with respect to the outside diameter of the core region (outside diameter c2 of the third core) concerning the samples 1 to 5 having the refractive index profile of FIG. 5B.
Figure 12B:
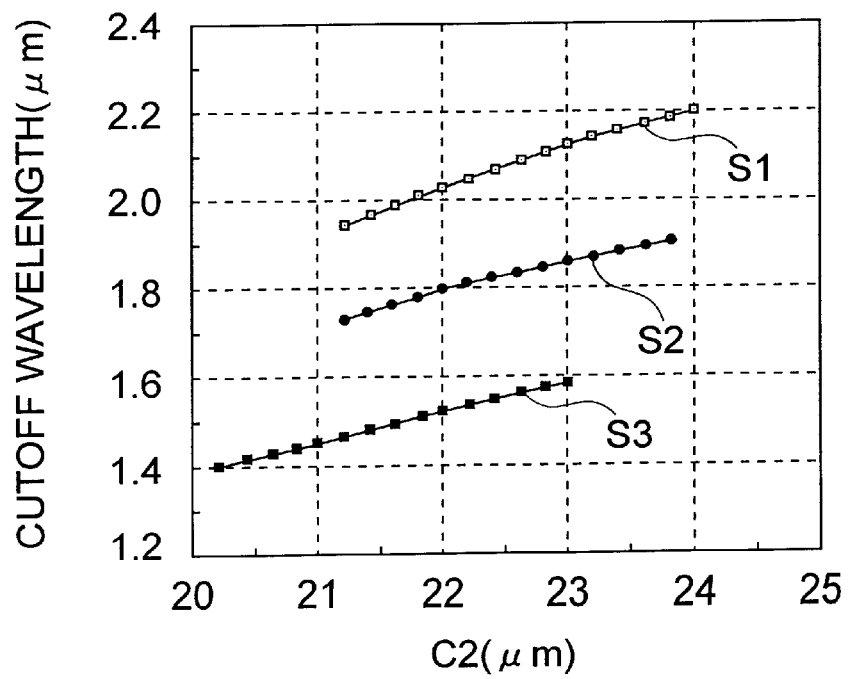

FIGS. 11A and 11B are graphs showing changes in dispersion slope (ps/nm$^2$/km) with respect to the outside diameter of the core region (outside diameter c2 of the third core) in the samples 1 to 5, whereas FIGS. 12A and 12B are graphs showing changes in cutoff wavelength ($\mu$m) with respect to the outside diameter of the third core c2. In FIGS. 11A to 12B, S1 to S5 indicate the graphs of the samples 1 to 5, respectively.

As can be seen from these graphs, when the relative refractive index difference $\Delta n_3$ of the third core with respect to the second cladding is too small, or when the ratio of the outside diameter of the second core with respect to the outside diameter of the third core (b2/c2) is too high, the dispersion slope cannot be suppressed to 0.03 ps/nm$^2$/km or less. Also, the cutoff wavelength at a length of 2 m is shortened, thereby the bending loss increases. As a consequence, for lowering the dispersion slope and elongating the cutoff wavelength at a length of 2 m so as to improve the bending loss, it is necessary that the relative refractive index difference $\Delta n_3$ of the third core be set to a large value, and that the third core have a large width. Here, in the dispersion-flattened optical fibers according to Embodiments 3 and 4 comprising the core region of the above-mentioned three-layer structure (having a third core), the profile volume of the third core given by the following expression (5):

$$\int_{b/2}^{c/2} \Delta n(r) r \, dr \tag{5}$$

was 13.8%·$\mu$m$^2$ and 8.7%·$\mu$m$^2$, respectively (see FIG. 9).

Figure 13A:
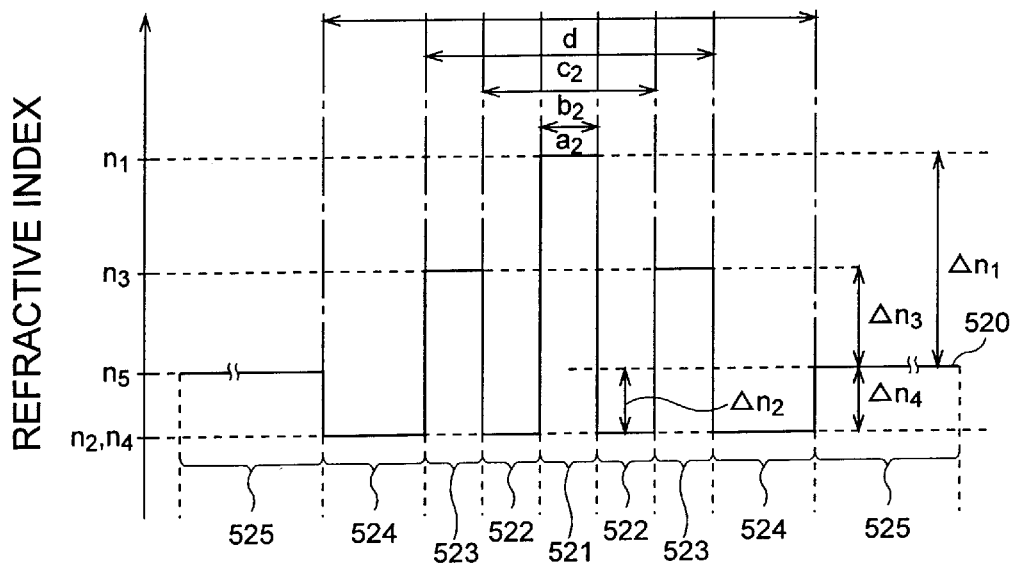
FIGS. 13A to 13C are modified examples (refractive index profiles) of the refractive index profile shown in FIG. 5B.
Figure 13B:
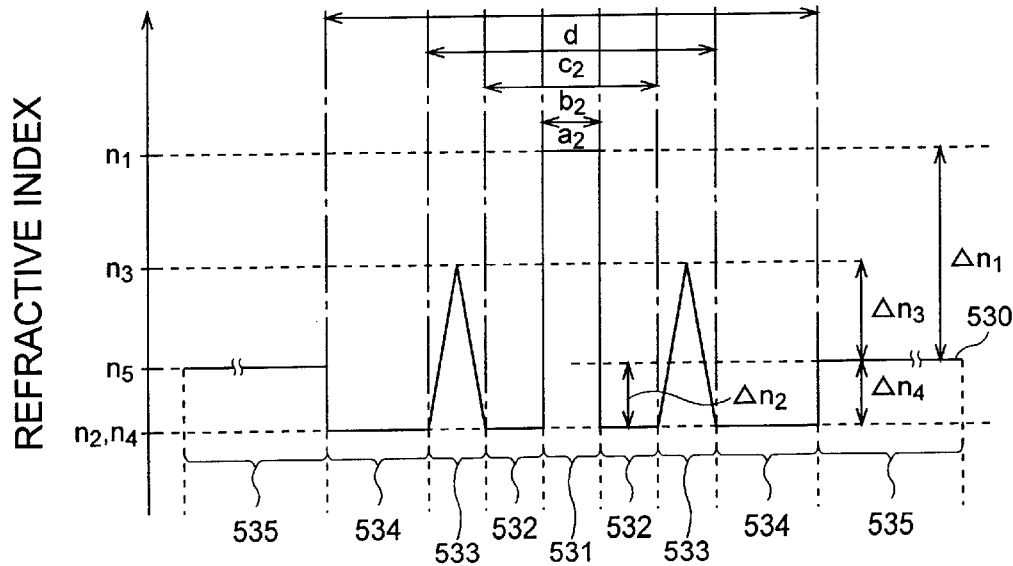
Figure 13C:
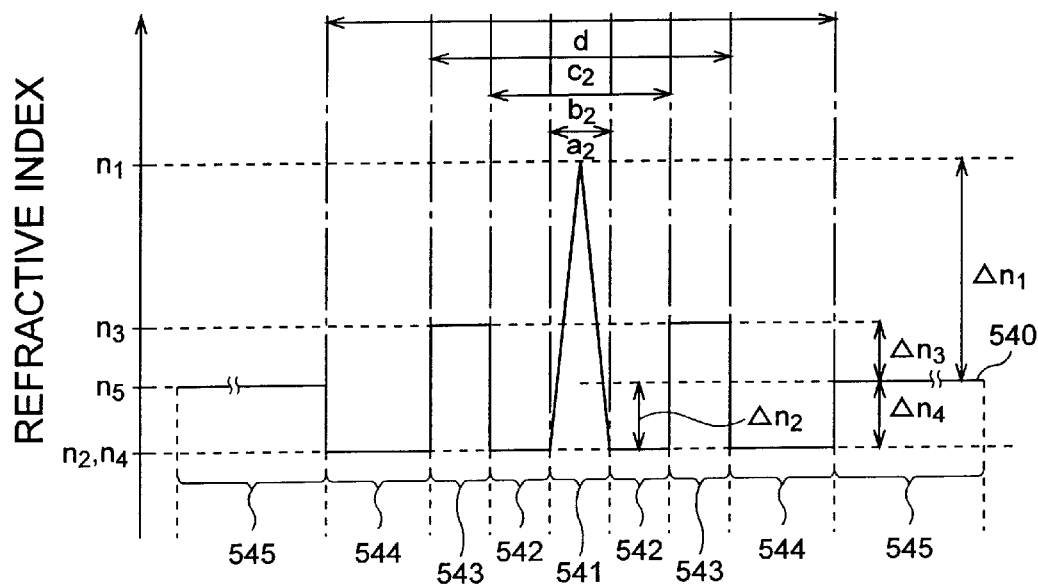

Next, as applied examples of the dispersion-flattened optical fiber according to Embodiment 3 (FIGS. 5A and 5B), the inventors prepared samples 6 to 9 having refractive index profiles shown in FIGS. 13A to 13C, respectively, and measured various characteristics of the samples 6 to 9 at a wavelength of 1550 nm. Here, thus prepared samples 6 to 9 have a structure similar to the cross-sectional structure shown in FIG. 5A, comprising a core region constituted by a first core, a second core, and a third core, and a cladding region constituted by a first cladding and a second cladding.

The sample 6 has a refractive index profile 520 shown in FIG. 13A, and the refractive index profile 520 is equivalent to the refractive index of each area along the line L2 in FIG. 5A. In this refractive index profile 520, areas 521, 522, 523, 524, and 525 correspond to the locations, on the line L2, of the first core 601, second core 602, third core 603, first cladding 701, and second cladding 702, respectively.

In the sample 6, the outside diameter a2 of the first core (refractive index $n_1$) corresponding to the area 521 is 5.7 $\mu$m, the outside diameter b2 of the second core (refractive index $n_2<n_1$) corresponding to the area 522 is 14.7 $\mu$m, the outside diameter c2 of the third core (refractive index $n_3>n_2$) corresponding to the area 523 is 22.6 $\mu$m, the outside diameter d of the first cladding (refractive index $n_4=n_2$) corresponding to the area 524 is 45.2 $\mu$m, and the outside diameter of the second cladding (refractive index $n_5>n_4$) corresponding to the area 525 is 125 $\mu$m. With respect to the second cladding, the relative refractive index difference $\Delta n_1$ ($=(n_1-n_5)/n_5$) of the first core is 0.60%, the relative refractive index difference $\Delta n_2$ ($=(n_2-n_5)/n_5$) of the second core and the relative refractive index difference $\Delta n_4$ ($=(n_4-n_5)/n_5$) of the first cladding are $-0.05\%$ each, and the relative refractive index difference $\Delta n_3$ ($=(n_3-n_5)/n_5$) of the third core is 0.30%. Further, the ratio of the outside diameter of the fist core to the outside diameter of the third core (a2/c2) is 0.25, and the ratio of the outside diameter of the second core to the outside diameter of the third core (b2/c2) is 0.65.

The sample 7 has a refractive index profile 530 shown in FIG. 13B, and the refractive index profile 530 is equivalent to the refractive index of each area along the line L2 in FIG. 5A. In this refractive index profile 530, areas 531, 532, 533, 534, and 535 correspond to the locations, on the line L2, of the first core 601, second core 602, third core 603, first cladding 701, and second cladding 702, respectively. In thus prepared sample 7, the form of the refractive index profile in the area 533 (corresponding to the refractive index profile in the diametrical direction of the third core area) differs from that of the area 513 in the refractive index profile 510 shown in FIG. 5B.

In the sample 7, the outside diameter a2 of the first core (refractive index $n_1$) corresponding to the area 531 is 5.6 $\mu$m, the outside diameter b2 of the second core (refractive index $n_2<n_1$) corresponding to the area 532 is 12.6 $\mu$m, the outside diameter c2 of the third core (refractive index $n_3>n_2$) corresponding to the area 533 is 24.2 $\mu$m, the outside diameter d of the first cladding (refractive index $n_4=n_2$) corresponding to the area 534 is 48.4 $\mu$m, and the outside diameter of the second cladding (refractive index $n_5>n_4$) corresponding to the area 535 is 125 $\mu$m. With respect to the second cladding, the relative refractive index difference $\Delta n_4$ ($=(n_1-n_5)/n_5$) of the first core is 0.60%, the relative refractive index difference $\Delta n_2$ ($=(n_2-n_5)/n_5$) of the second core and the relative refractive index difference $\Delta n_4$ ($=(n_4-n_5)/n_5$) of the first cladding are $-0.05\%$ each, and the relative refractive index difference $\Delta n_3$ ($=(n_3-n_5)/n_5$) of the third core is 0.41%. Further, the ratio of the outside diameter of the fist core to the outside diameter of the third core (a2/c2) is 0.23, and the ratio of the outside diameter of the second core to the outside diameter of the third core (b2/c2) is 0.52.

The sample 8 has a refractive index profile 540 shown in FIG. 13C, and the refractive index profile 540 shown is equivalent to the refractive index of each area along the line L2 in FIG. 5A. In this refractive index profile 540, areas 541, 542, 543, 544, and 545 correspond to the locations, on the line L2, of the first core 601, second core 602, third core 603, first cladding 701, and second cladding 702, respectively. In thus prepared sample 8, the form of the refractive index profile in the area 541 (corresponding to the refractive index profile in the diametrical direction of the first core area) differs from that of the area 511 in the refractive index profile 510 shown in FIG. 5B.

In the sample 8, the outside diameter a2 of the first core (refractive index $n_1$) corresponding to the area 541 is 8.6 μm, the outside diameter b2 of the second core (refractive index $n_2<n_1$) corresponding to the area 542 is 17.6 μm, the outside diameter c2 of the third core (refractive index $n_3>n_2$) corresponding to the area 543 is 25.2 μm, the outside diameter d of the first cladding (refractive index $n_4=n_2$) corresponding to the area 544 is 50.4 μm, and the outside diameter of the second cladding (refractive index $n_5>n_4$) corresponding to the area 545 is 125 μm. With respect to the second cladding, the relative refractive index difference $\Delta n_1$ ($=(n_1-n_5)/n_5$) of the first core is 0.85%, the relative refractive index difference $\Delta n_2$ ($=(n_2-n_5)/n_5$) of the second core and the relative refractive index difference $\Delta n_4$ ($=(n_4-n_5)/n_5$) of the first cladding are −0.05% each, and the relative refractive index difference $\Delta n_3$ ($=(n_3-n_5)/n_5$) of the third core is 0.29%. Further, the ratio of the outside diameter of the fist core to the outside diameter of the third core (a2/c2) is 0.34, and the ratio of the outside diameter of the second core to the outside diameter of the third core (b2/c2) is 0.74.

On the other hand, the sample 9 has a similar refractive index profile to the above-mentioned sample 6. Therefore, in sample 9, the outside diameter a2 of the first core (refractive index $n_1$) corresponding to the area 521 is 6.6 μm, the outside diameter b2 of the second core (refractive index $n_2<n_1$) corresponding to the area 522 is 18.9 μm, the outside diameter c2 of the third core (refractive index $n_3>n_2$) corresponding to the area 523 is 25.5 μm, the outside diameter d of the first cladding (refractive index $n_4=n_2$) corresponding to the area 524 is 41.0 μm, and the outside diameter of the second cladding (refractive index $n_5>n_4$) corresponding to the area 525 is 125 μm. With respect to the second cladding, the relative refractive index difference $\Delta n_4(=(n_4-n_5)/n_5)$ of the first core is 0.50%, the relative refractive index difference $\Delta n_2$ ($=(n_2-n_5)/n_5$) of the second core and the relative refractive index difference $\Delta n_4$ ($=(n_4-n_5)/n_5$) of the first cladding are −0.15% each, and the relative refractive index difference $\Delta n_3$ ($=(n_3-n_5)/n_5$) of the third core is 0.43%. Further, the ratio of the outside diameter of the fist core to the outside diameter of the third core (a2/c2) is 0.26, and the ratio of the outside diameter of the second core to the outside diameter of the third core (b2/c2) is 0.74. By this design, a dispersion flattened optical fiber, which has a positive dispersion value and an exceedingly small dispersion slope, can be obtained.

FIG. 14 shows various characteristics of thus designed samples 6 to 9 at a wavelength of 1550 nm. Here, in view of the individual values of the above-mentioned samples 3 to 9, the profile volume of the third core given by expression (5) is preferably 7.0%·μm$^2$ or more.

Further, the inventors measured a plurality of prepared samples in terms of relationships between the outside diameter c2 of the third core (outside diameter of the core region) and the above-mentioned various characteristics concerning the dispersion-flattened optical fiber having the refractive index profile shown in FIG. 13B (sample 7). In the prepared samples, with respect to the second cladding, the relative refractive index difference $\Delta n_1$ ($=(n_1-n_5)/n_5$) of the first core is 0.61%, the relative refractive index difference $\Delta n_2(=(n_2-n_5)/n_5)$ of the second core and the relative refractive index difference $\Delta n_4$ ($=(n_4-n_5)/n_5$) of the first cladding are −0.05% each, and the relative refractive index difference $\Delta n_3$ ($=(n_3-n_5)/n_5$) of the third core is 0.35%. The second cladding is made of pure quartz. Further, the ratio of the outside diameter of the fist core to the outside diameter of the third core (a2/c2) is 0.23, and the ratio of the outside diameter of the second core to the outside diameter of the third core (b2/c2) is 0.52, and the ratio of the outside diameter of the first cladding to the outside diameter of the third core (d/c2) is 1.8.

FIGS. 15A to 15D show the results of measurement of the prepared samples, indicating the relationship between the outside diameter c2 (μm) of the third core and the effective cross-sectional area $A_{eff}$ (μm$^2$), the relationship between the outside diameter c2 (μm) of the third core and the bending loss (dB/m) when bent at a diameter of 20 mm, the relationship between the outside diameter c2 (μm) of the third core and the dispersi on slope (ps/nm$^2$/km), and the relationship between the outside diameter c2 (μm) of the third core and the dispersion (ps/nm/km), respectively. In each graph, curves L3, L4, L5, and L6 are theoretical curves obtained by calculation, and plotted dots represent measured values.

As can be seen from these graphs, the resulting dispersion-flattened optical fibers have, at a wavelength of 1550 nm, a dispersion value of −4 to +4 ps/nm/km (<|5| ps/nm/km), a dispersion slope of 0.026 to 0.028 ps/nm$^2$/km (<0.03 ps/nm$^2$/km), and an effective cross-sectional area $A_{eff}$ of 47 to 52 μm$^2$ (>45 μm$^2$).

Figure 15A:
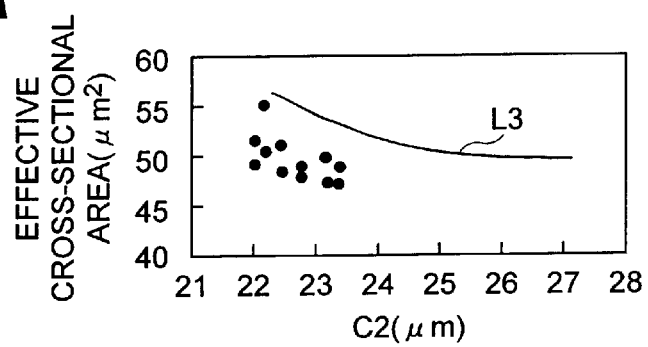
Figure 15B:
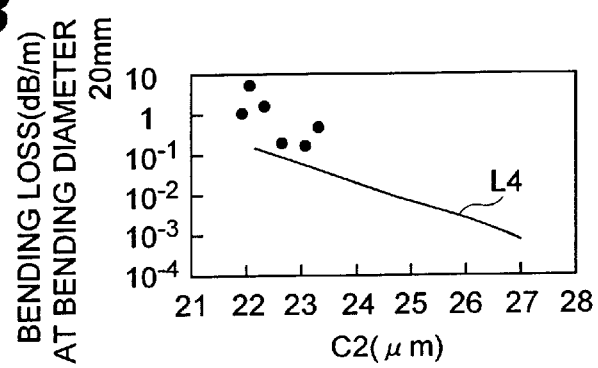
Figure 15C:
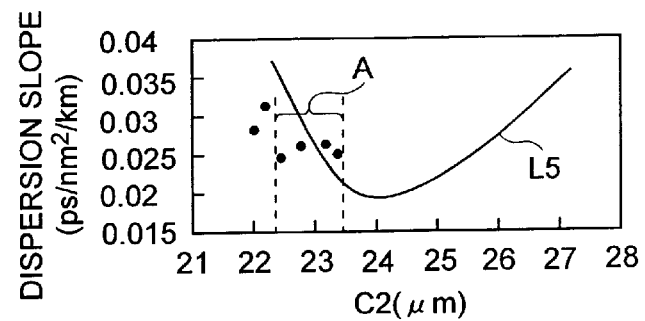
Figure 15D:
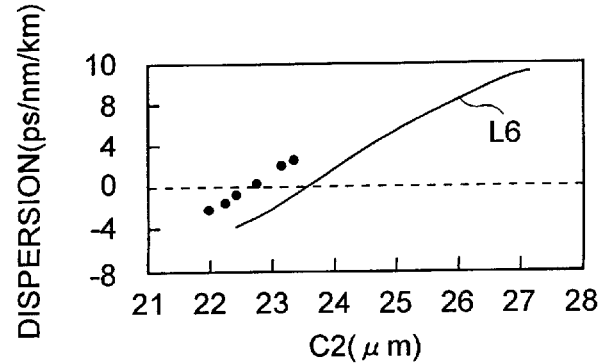

To be noted in FIG. 15C in particular is that the fluctuation in dispersion slope is small in the area indicated by A in the graph even when the outside diameter of the third core fluctuates. In general, when making an optical fiber, about ±2% of fluctuations in manufacture may occur in the outside diameter of the core region among manufactured lots (i.e., the outside diameter is only controllable within a range not smaller than about ±2%). Therefore, if the outside diameter of the core region can be controlled within the range in which fluctuations in dispersion slope are suppressed, characteristics among the products (dispersion-flattened optical fibers) can be prevented from fluctuating due to the fluctuations in manufacture as a matter of course.

Figure 16A:
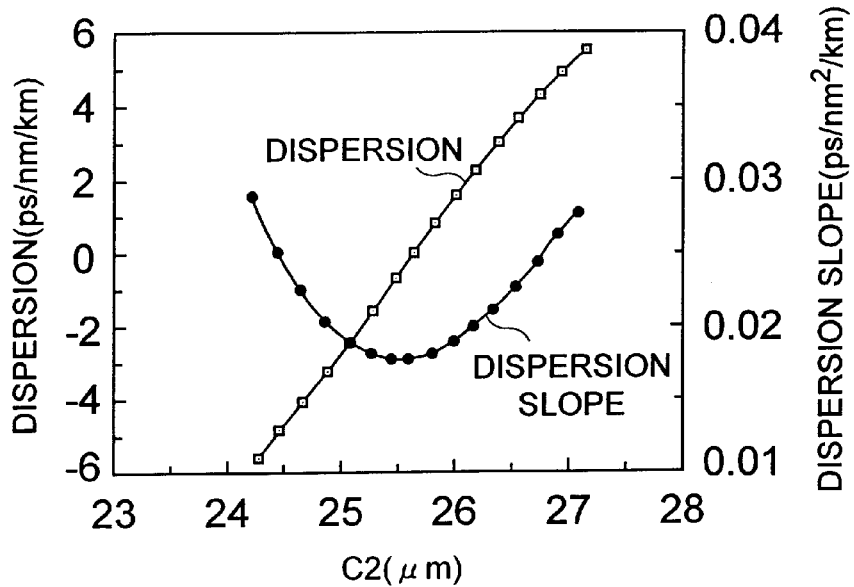
Figure 16B:
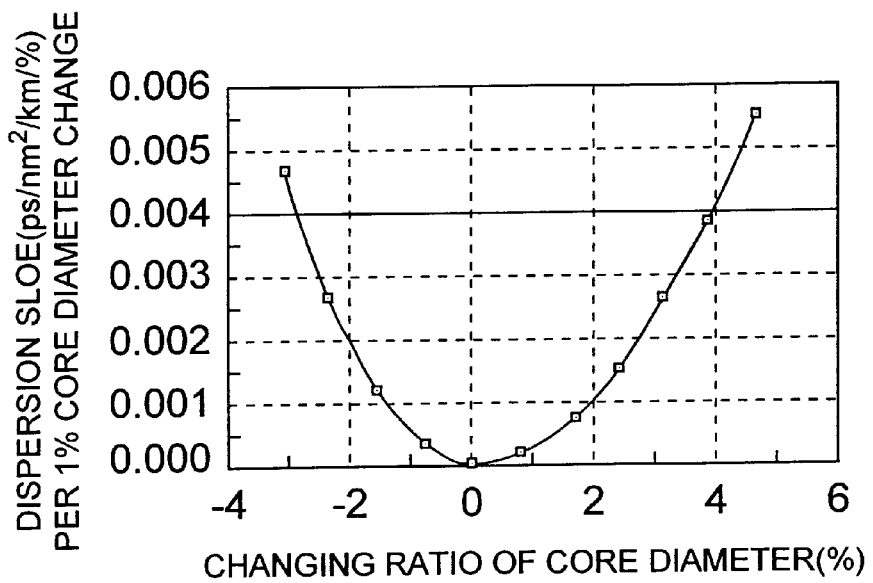

FIGS. 16A and 16B are graphs showing relationships between fluctuations in outside diameter of the core region and fluctuations in various characteristics, in which FIG. 16A indicates relationships between the outside diameter c2 of the third core and the dispersion (ps/nm/km) and the dispersion slope (ps/nm$^2$/km), whereas FIG. 16B indicates a relationship of the amount of change in dispersion slope (ps/nm$^2$/km/%) to the ratio of change in outside diameter of the core region (%). In FIG. 16A, D represents dispersion and DS represents dispersion slope.

As can be seen from FIG. 16A, while the dispersion value increases as the diameter of area where the signal light is propagated (mainly the core region) increases in diameter, the dispersion slope attains a minimum value when the outside diameter c2 of the third core is at a certain value. In particular, the fluctuation of dispersion slope becomes small in the proximity of this minimum value. Specifically, as can be seen from the graph shown in FIG. 16B, when the dispersion-flattened optical fiber is designed such that the outside diameter of the core region is set to an appropriate value, the amount of change in dispersion slope can be suppressed to 0.003 ps/nm$^2$/km/% or less with respect to the ratio of change in outside diameter of the core region within the range of ±2% in which the outside diameter is controllable.

The bending loss (dB/m) and cutoff wavelength in the dispersion-flattened optical fiber according to the present invention will now be explained.

Figure 17A:
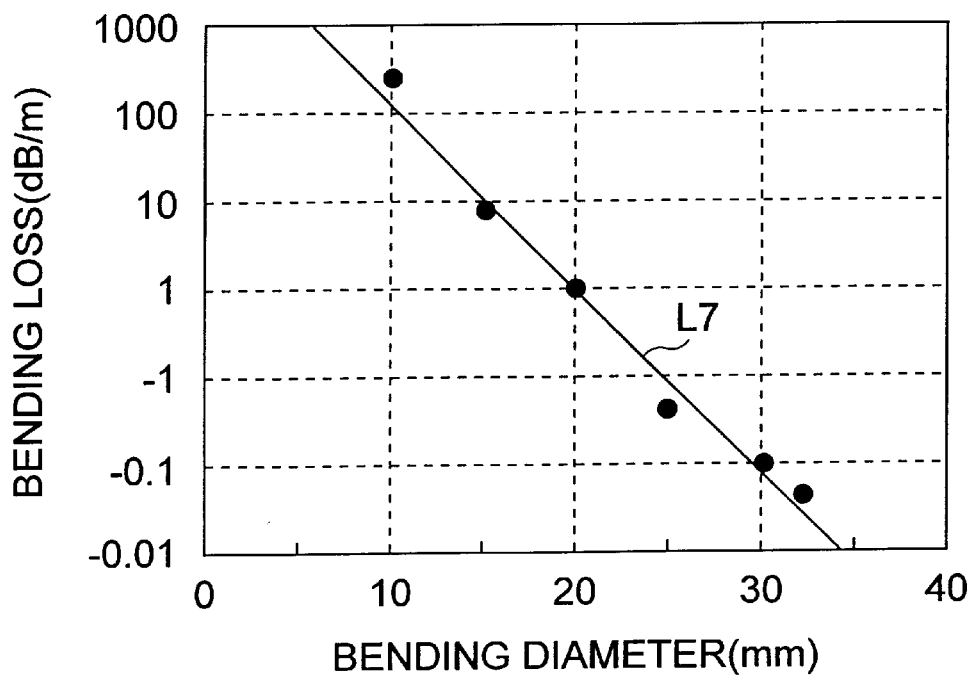

FIG. 17A is a graph plotting measured values of bending loss (dB/m) with respect to changes in bending diameter (mm), while the outside diameter c2 of the third core is constantly held at 22.4 μm. In this graph, L7 represents a theoretical value obtained by calculation. As can be seen from this graph, the bending loss at a bending diameter of 32 mm is 0.04 dB/m (=0.004 dB/turn), which is a favorable value.

Figure 17B:
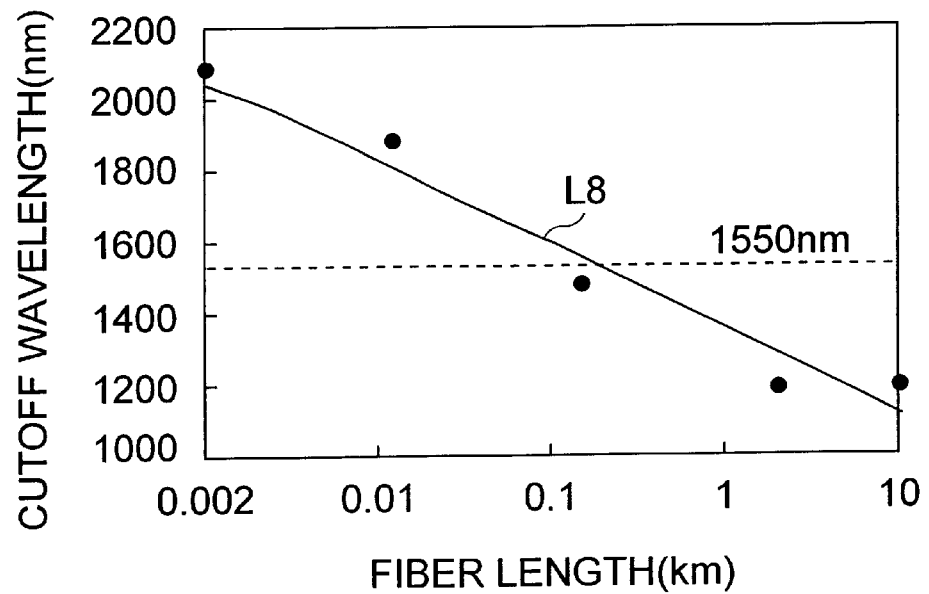
FIG. 17B is a graph showing a relationship between the fiber length (km) and the cutoff wavelength (μm)

On the other hand, FIG. 17B is a graph plotting measured values of cutoff wavelength ($\mu$m) with respect to changes in fiber length (km), while the outside diameter c2 of the third core is constantly held at 22.8 $\mu$m. In this graph, L8 represents a theoretical value obtained by calculation. The gradient of the line L8 is −252 nm/decade. As can be seen from this graph, even when the cutoff wavelength at a length of 2 m is 2.080 $\mu$m, a single-mode operation can be assured at a length of about 200 m or longer. As a consequence, there is no problem in practice even when the cutoff wavelength at a length of 2 m is longer than the signal light wavelength (since an optical transmission line in a submarine cable or the like is usually constituted by fusing together a plurality of optical fibers each having a length of about 5 km).

Figure 18A:
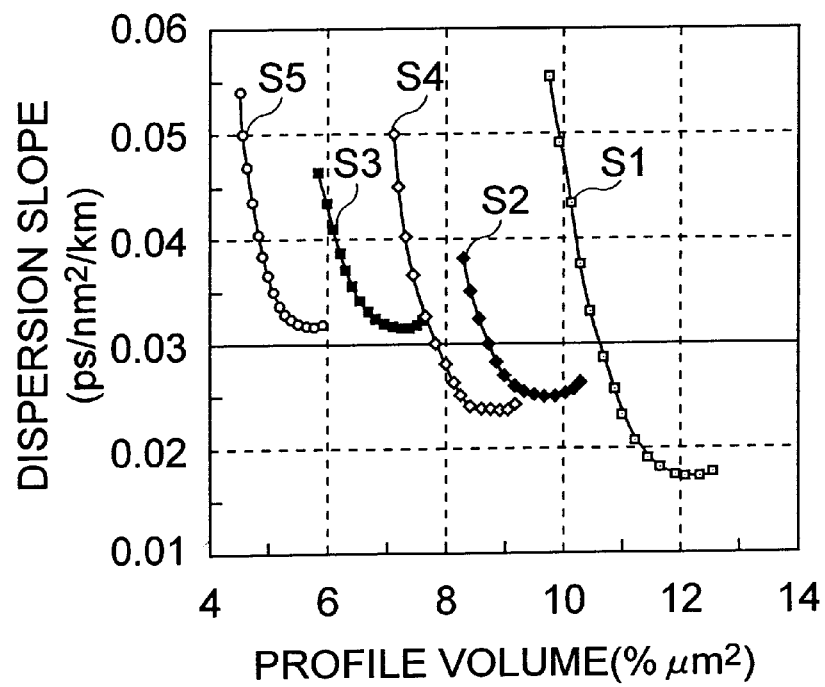
Figure 18B:
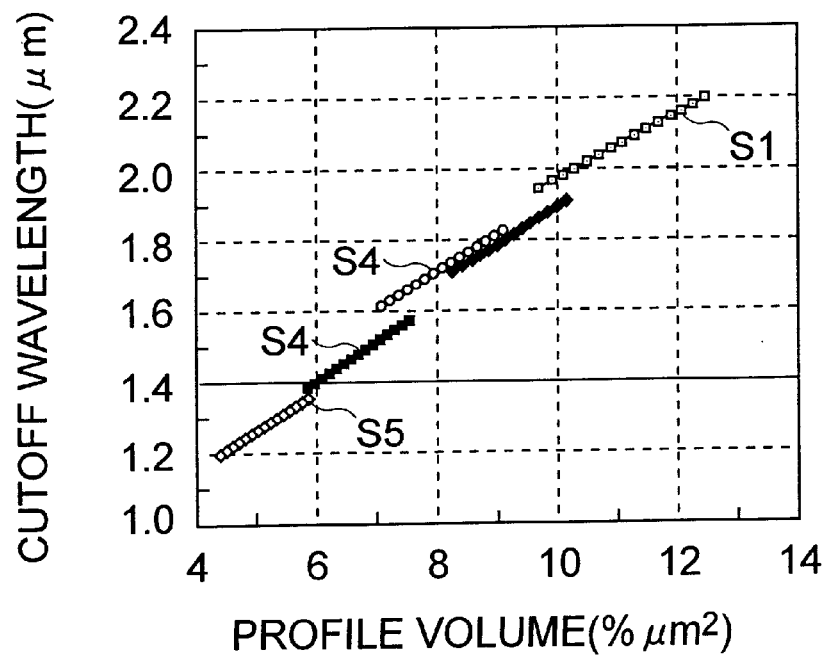
FIG. 18B is a graph showing a relationship between the profile volume (%·μm²) of the third core and the cutoff wavelength (μm) concerning the samples 1 to 5.

FIG. 18A is a graph showing a relationship between the profile volume (%.$\mu$m$^2$) of the third core and the dispersion slope (ps/nm$^2$/km) in each of the above-mentioned samples 1 to 5, whereas FIG. 18B is a graph showing a relationship between the profile volume (%.$\mu$m$^2$) of the third core and the cutoff wavelength ($\mu$m) in each of the samples 1 to 5. As mentioned above, the cutoff wavelength at a length of 2 m is needed to be 1.4 $\mu$m or more in the dispersion-flattened optical fiber having a core region of three-layer structure (Embodiments 3 and 4 comprising the third core). Also, it is preferred that the dispersion slope be 0.03 ps/nm$^2$/km or less. Consequently, for satisfying these restrictions, in view of FIGS. 18A and 18B, the profile volume in the third core (see expression (5)) must be 7.0% $\mu$m$^2$ or greater. In FIGS. 18A and 18B, S1 to S5 represent dispersion slopes and cutoff wavelengths with respect to profile volumes of the above-mentioned samples 1 to 5, respectively.

INDUSTRIAL APPLICABILITY

As explained in detail in the foregoing, the dispersion-flattened optical fiber according to the present invention has, at a wavelength of 1550 nm, a dispersion with an absolute value not greater than 5 ps/nm/km and a dispersion slope of 0.03 ps/nm$^2$/km or less, thereby being capable of suppressing differences in dispersion value among individual signal light components over the whole wavelength band employed. Also, the effective cross-sectional area is preferably 45 $\mu$m$^2$ or more. When such an appropriate relationship between the effective cross-sectional area and the dispersion slope is realized, the power density of signal light in the dispersion-flattened optical fiber is suppressed to a low level, thus effectively restraining nonlinear optical phenomena from occurring, thereby enabling transmission with a high S/N. Further, since the cutoff wavelength at a length of 2 m is 1.0 $\mu$m or more, this dispersion-flattened optical fiber has an excellent bending characteristic. Therefore, this dispersion-flattened optical fiber is suitable for the time-division multiplexing transmission or wavelength-division multiplexing soliton transmission using an optical amplifier.

Also, when the effective cross-sectional area is 70 $\mu$m$^2$ or more, the power density of signal light in the dispersion-flattened optical fiber can be suppressed to a lower level, thereby nonlinear optical phenomena are more effectively restrained from occurring. Therefore, this dispersion-flattened optical fiber is more suitable for the time-division multiplexing transmission or wavelength-division multiplexing soliton transmission using an optical amplifier.

What is claimed is:

1. A dispersion-flattened optical fiber comprising a core region extending along a predetermined axis and a cladding provided on the outer periphery of said core region, said dispersion-flattened optical fiber having:

a dispersion with an absolute value of 5 ps/nm/km or less at the wavelength of 1550 nm;

an effective cross-sectional area of 45 $\mu$m$^2$ or more at the wavelength of 1550 nm;

a dispersion slope of 0.03 ps/nm$^2$/km or less at a wavelength of 1550 nm;

a cutoff wavelength of 1.0 $\mu$m or more at a length of 2 m; and a transmission loss of 0.5 dB/turn or less when bent into a diameter of 32 mm at the wavelength of 1550 nm.

2. A dispersion-flattened optical fiber according to claim 1, wherein said effective cross-sectional area is 50 $\mu$m$^2$ or more, and said dispersion slope is 0.02 ps/nm$^2$/km or less.

3. A dispersion-flattened optical fiber according to claim 1, wherein said core region comprises a first core having a predetermined refractive index; and a second core, provided on the outer periphery of said first core, having a refractive index higher than that of said first core.

4. A dispersion-flattened optical fiber according to claim 1, wherein said core region comprises a first core having a predetermined refractive index; a second core, provided on the outer periphery of said first core, having a refractive index lower than that of said first core; and a third core, provided on an outer periphery of said second core, having a refractive index higher than that of said second core.

5. A dispersion-flattened optical fiber according to claim 1, further having, as a characteristic at said wavelength of 1550 nm, a polarization dispersion of 0.15 ps/km$^{1/2}$ or less.

6. A dispersion-flattened optical fiber according to claim 1, wherein cutoff wavelength at a length of 2 m is 1.4 $\mu$m or more.

7. A dispersion-flattened optical fiber according to claim 4, wherein, when the outside diameter of said second core is b, the outside diameter of said third core is c, and the relative refractive index difference of said third core with respect to a reference area in said cladding region is $\Delta n_3$, the relationships:

$\Delta n_3 \geq 0.25\%$ $0.40 \leq b/c \leq 0.75$ are satisfied.

8. A dispersion-flattened optical fiber according to claim 7, wherein, when the relative refractive index difference of said third core with respect to the reference area in said cladding region is $\Delta n(r)$ at a location where the radial distance from a center of said core region is r, the relationship:

$$\int_{b/2}^{c/2} \Delta n(r) r \, dr \geq 7.0 \ (\% \cdot \mu m^2)$$

is satisfied.

9. A dispersion-flattened optical fiber according to claim 7, wherein said cladding region comprises a first cladding, provided on the outer periphery of said third core, having a refractive index lower than that of said third core; and a second cladding corresponding to said reference area, provided on the outer periphery of said first cladding, having a refractive index higher than that of said first cladding; and wherein, when the outside diameter of said first core is a, the outside diameter of said second core is b, the outside diameter of said third core is c, the relative refractive index difference of said first core with respect to said second cladding is $\Delta n_1$, and the relative refractive index difference of said first cladding with respect to said second cladding is $\Delta n_4$, the relationships:

$0.40\% \leq \Delta n_1 \leq 0.90\%$ $\Delta n_4 \leq -0.02\%$ $0.20 \leq a/c \leq 0.35$ $20\ \mu m \leq c \leq 30\ \mu m$ are satisfied.

10. A dispersion-flattened optical fiber according to claim 1, wherein the outside diameter of said core region is set within a variable range of ±2% centered at a value where said dispersion slope acquires a minimum value.

11. A dispersion-flattened optical fiber according to claim 1, wherein the amount of change of said dispersion slope with respect to a fluctuation in outside diameter of said core region ranging ±2% is 0.003 ps/nm²/km or less.

12. A dispersion-flattened optical fiber comprising a core region extending along a predetermined axis, and acladding provided on the outer periphery of said core region, wherein said dispersion-flattened optical fiber having, as characteristics at a wavelength of 1550 nm, an effective cross-sectional area of 45 $\mu m^2$ or more and a dispersion slope of 0.03 ps/nm²/km or less, and wherein said core region comprising a first core having a predetermined refractive index and a relative refractive index difference of 0.6% or less with respect to a reference area of said cladding region; a second core, provided on the outer periphery of said first core, having a refractive index lower than that of said first core; and a third core, provided on the outer periphery of said second core, having a refractive index higher than that of said second core.

13. An dispersion-flattened optical fiber according to claim 12, wherein said effective cross-sectional area is 50 $\mu m^2$ or more, and said dispersion slope is 0.02 ps/nm²/km or less, said dispersion-flattened optical fiber further having, as a characteristic at said wavelength of 1550 nm, a dispersion with an absolute value of 5 ps/nm/km or less.

14. An dispersion-flattened optical fiber according to claim 12, further having, as a characteristic at said wavelength of 1550 nm, a polarization dispersion of 0.15 ps/km$^{1/2}$ or less.

15. A dispersion-flattened optical fiber according to claim 12, wherein transmission loss when bent into a diameter of 32 m is 0.5 dB/turn or less.

16. A dispersion-flattened optical fiber according to claim 12, wherein, when the outside diameter of said second core is b, the outside diameter of said third core is c, and the relative refractive index difference of said third core with respect to the reference area in said cladding region is $\Delta n_3$, the relationships:

$\Delta n_3 \geq 0.25\%$ $0.40 \leq b/c \leq 0.75$ are satisfied.

17. A dispersion-flattened optical fiber according to claim 16, wherein, when the relative refractive index difference of said third core with respect to the reference area in said cladding region is $\Delta n(r)$ at a location where the radial distance from a center of said core region is r, the relationship:

$$\int_{b/2}^{c/2} \Delta n(r) r\, dr \geq 7.0\ (\% \cdot \mu m^2)$$

is satisfied.

18. A dispersion-flattened optical fiber according to claim 12, wherein said cladding region comprises a first cladding, provided on the outer periphery of said third core, having a refractive index lower than that of said third core; and a second cladding corresponding to said reference area, provided on the outer periphery of said first cladding, having a refractive index higher than that of said first cladding; and wherein, when the outside diameter of said first core is a, the outside diameter of said second core is b, the outside diameter of said third core is c, the relative refractive index difference of said first core with respect to said second cladding is $\Delta n_1$, and the relative refractive index difference of said first cladding with respect to said second cladding is $\Delta n_4$, the relationships:

$\Delta n_4 \geq -0.02\%$ $0.20 \leq a/c \leq 0.35$ $20\ \mu m \leq c \leq 30\ \mu m$ are satisfied.

19. A dispersion-flattened optical fiber according to claim 12, wherein the outside diameter of said core region is set within a variable range of ±2% centered at a value where said dispersion slope acquires a minimum value.

20. A dispersion-flattened optical fiber according to claim 12, wherein the amount of change of said dispersion slope with respect to a fluctuation in outside diameter of said core region ranging ±2% is 0.003 ps/nm²/km or less.

* * * * *